US012612812B2

(12) United States Patent
Watkins et al.

(10) Patent No.: US 12,612,812 B2
(45) Date of Patent: Apr. 28, 2026

(54) LOCKS

(71) Applicant: SnapRays, LLC, Vineyard, UT (US)

(72) Inventors: Sean D. Watkins, Spanish Fork, UT (US); Michael A. Luebke, American Fork, UT (US); R. Camden Robinson, Lindon, UT (US); Henry J. Howell, Herriman, UT (US); Ancel Curativo, Cavite (PH)

(73) Assignee: SnapRays, LLC, Vineyard, UT (US)

( * ) Notice: Subject to any disclaimer, the term of this patent is extended or adjusted under 35 U.S.C. 154(b) by 0 days.

(21) Appl. No.: 18/664,218

(22) Filed: May 14, 2024

(65) Prior Publication Data

US 2025/0137305 A1 May 1, 2025

Related U.S. Application Data

(60) Provisional application No. 63/546,899, filed on Nov. 1, 2023.

(51) Int. Cl.
*E05C 19/18* (2006.01)
*E05C 17/36* (2006.01)

(52) U.S. Cl.
CPC ............ *E05C 19/182* (2013.01); *E05C 17/36* (2013.01)

(58) Field of Classification Search
CPC ............... E05B 65/0014; E05B 65/466; E05B 2047/0091; E05C 17/36; E05C 17/54; E05C 19/182; E05C 19/007; E05C 19/18; E05C 19/184; E05C 19/188; E05C 1/004; E05C 1/10; E05C 9/20; E05C 9/22; Y10T 292/379; Y10T 292/084; Y10T 292/0846; Y10T 292/0902; Y10T 292/0951; Y10T 292/0918; Y10T 292/0934; Y10T 292/1022; Y10T 292/1061; Y10T 292/104; Y10T 292/57
See application file for complete search history.

(56) References Cited

U.S. PATENT DOCUMENTS

| | | | | | |
|---|---|---|---|---|---|
| 978,658 | A * | 12/1910 | Schnell | E05B 65/0811 | 292/128 |
| 1,133,254 | A * | 3/1915 | Backus | E05C 3/30 | 292/254 |
| 2,050,695 | A * | 8/1936 | Fetyk | E05B 65/0894 | 70/95 |
| 2,196,899 | A * | 4/1940 | Freedman | E05C 19/182 | 292/297 |
| 2,803,278 | A * | 8/1957 | Dean | E05C 19/182 | 269/279 |

(Continued)

FOREIGN PATENT DOCUMENTS

| | | | | |
|---|---|---|---|---|
| CA | 2296994 C | * 11/2004 | E05C 3/14 |
| CN | 101292073 A | * 10/2008 | E05B 65/0014 |

(Continued)

*Primary Examiner* — Steven A Tullia
(74) *Attorney, Agent, or Firm* — Young Basile Hanlon & MacFarlane, P.C.

(57) ABSTRACT

A door lock system includes a first component mounted on one side of a door and a second component mounted on the opposite side. The system features a structure that mechanically connects the two components, designed to pass through the gap between the closed door and its frame. Additionally, the system incorporates a communication link between the first and second components.

18 Claims, 32 Drawing Sheets

(56) References Cited

U.S. PATENT DOCUMENTS 3,262,292 A * 7/1966 Glass .................... E05C 19/182 70/95
4,023,878 A * 5/1977 Hennessey ............. H01R 12/82 292/87
4,387,919 A 6/1983 Quaintance et al.
4,399,672 A * 8/1983 Moorhouse ............. E05C 19/18 292/296
4,690,440 A * 9/1987 Rogers ................ E05B 65/0007 292/228
4,993,759 A * 2/1991 Thomas .................. E05C 3/047 292/207
5,498,041 A * 3/1996 Bezzerides ........... E05B 53/003 292/225
5,542,723 A 8/1996 Scharf
6,412,317 B1 * 7/2002 Martin ...................... E05B 9/08 70/451
6,422,613 B1 * 7/2002 Boroviak ............ E05B 65/0007 292/128
6,431,615 B1 * 8/2002 Bastian ................... E05C 3/165 292/121
6,471,261 B1 * 10/2002 Messler .................... E05C 5/00 292/205
6,604,764 B2 * 8/2003 Zemzik ................. E05C 19/188 292/288
6,851,286 B2 * 2/2005 Dube ........................ E05C 1/14 292/336.3
7,344,167 B2 * 3/2008 Johnson .................. E05C 19/18 292/288
8,028,376 B2 * 10/2011 Karapetyan ........... E05B 17/005 16/86 A
8,191,938 B2 * 6/2012 Zimmerlee ............... E05C 3/14 292/226
8,544,899 B2 * 10/2013 Hertrich ................ E05C 19/188 292/DIG. 60
8,833,118 B1 * 9/2014 McLane .................... E05C 1/08 292/DIG. 60
9,528,306 B2 * 12/2016 Wepf .................. E05B 17/2038
9,650,812 B2 * 5/2017 Denison .................. E05B 65/46
10,358,849 B2 * 7/2019 Glover .................... E05B 17/10
10,718,134 B1 * 7/2020 Dory ..................... E05B 17/002
11,105,130 B2 * 8/2021 Seelbinder ............. G08B 21/02
11,371,272 B2 * 6/2022 Pesacov ................ E05C 17/047
11,466,487 B2 * 10/2022 Jeffries ...................... E05D 3/02
11,542,734 B1 * 1/2023 Gunkler .................. E05C 17/02
11,746,566 B2 * 9/2023 Adamosky ................ E05C 1/06 292/137
11,812,850 B2 * 11/2023 Huggan .................... E05C 1/00
12,091,890 B1 * 9/2024 McIntire ............. E05B 47/0001
2010/0123321 A1 * 5/2010 Timothy ................... E05C 3/30 70/91
2013/0180294 A1 7/2013 Pomerantz et al.
2017/0363344 A1 12/2017 Rumble
2018/0320415 A1 * 11/2018 Yang ................... E05B 65/0007
2020/0340273 A1 * 10/2020 Raber ................. E05B 17/2065
2021/0123273 A1 * 4/2021 Fleming .............. E05B 65/0035
2022/0372790 A1 * 11/2022 Van Duyne ......... E05B 63/0004
2025/0137305 A1 * 5/2025 Watkins .............. E05B 65/0014
2025/0188775 A1 * 6/2025 Schmutter ............... E05B 17/06

FOREIGN PATENT DOCUMENTS

DE 29825061 U1 * 7/2004 ............. E05D 13/00
DE 102008023633 A1 * 11/2009 ......... E05B 65/0021
DE 9305925 U1 * 9/2016 ........... E05C 17/047
DE 202015004415 U1 * 9/2016 ............. E05B 65/10
EP 3441549 B1 * 10/2019 ............... E05C 1/04
GB 2503242 A * 12/2013 ........... E05C 19/184
GB 2574695 A * 12/2019 ............... E05C 7/04

* cited by examiner

LOCKS

CROSS-REFERENCE TO RELATED APPLICATION(S)

This application claims priority to and the benefit of U.S. Provisional Patent Application Ser. No. 63/546,899 filed Nov. 1, 2023, the entire disclosure of which is hereby incorporated by reference.

TECHNICAL FIELD

This disclosure relates generally to door locks, and more particularly to child locks that may be retrofit to doors within a home or other building.

BACKGROUND

In recent years, the development and innovation in child safety devices have become increasingly significant due to the growing awareness of child safety within domestic environments. Among these devices, locks designed for doors represent an important aspect of preventing accidents and ensuring the safety of young children, pets and elderly. Traditional child locks often present limitations in adaptability and effectiveness, which can compromise their utility in diverse home settings. The present invention seeks to address these shortcomings by introducing various lock mechanisms that are versatile, secure, and easy to install. These innovative designs are described through various illustrations that demonstrate the functionality and adaptability of these locking mechanisms.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples.

Additionally, features shown and/or described in connection with one figure may be combined with features shown and/or described in connection with other figures. As used in the present specification and in the appended claims, the term "a number of" or similar language is meant to be understood broadly as any positive number comprising 1 to infinity; zero not being a number, but the absence of a number.

Figure 1A:
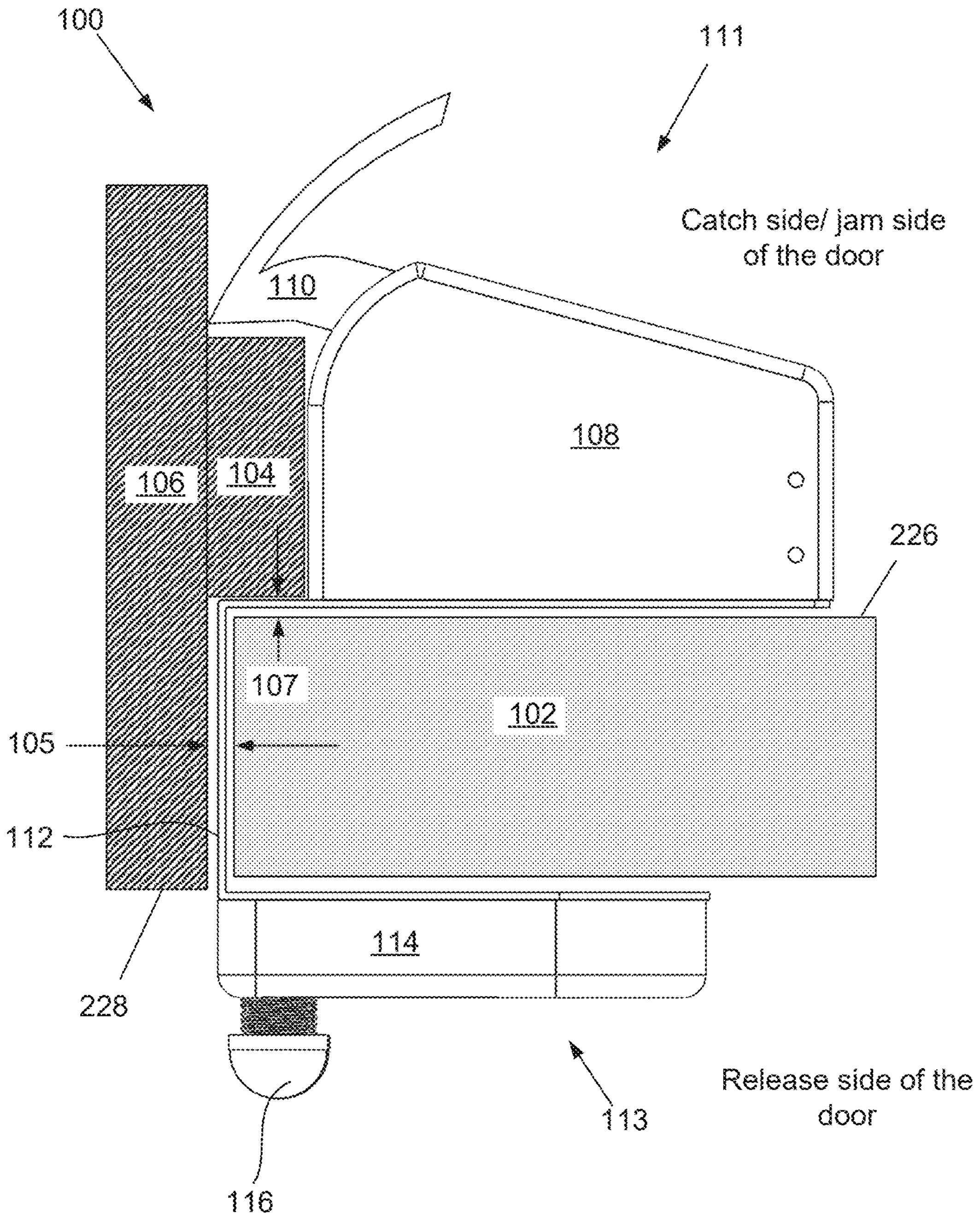
FIGS. 1A-1G show an illustrative lock shaped to fit around the door and interact with the door jamb, according to one example of principles described herein.

FIG. 1A illustrates a lock (100). In this example, the lock (100) is secured around a door (102) and latches behind a door jamb (104) which is connected to a door frame (106). This prevents the door (102) from being opened by a child. In this example, the lock (100) includes a catch mechanism (111) and a release mechanism (113) that are connected by a U bracket (112). The catch mechanism (111) includes a catch body (108) and a catch (110). In this example, the release mechanism (113) includes a release body (114) and at least one instance of a screw (116).

The catch (110) retracts and extends from the catch body (108). When extended from the catch body (108) as shown in FIG. 1, the catch (110) extends across the door jamb/stop (104). This prevents the door (102) from opening as long as the catch (110) remains extended from the catch body (108). The catch body (108) is adapted to receive the catch (110) and also may include one or more mechanisms to retract the catch (110). The U bracket (112) connects the catch body (108) and the release body (114) by going between the door (102) and the door frame (106). The release body (114) is used to release the lock (100) to open the door (102). In this example, the screw (116) is threaded through the release body (114) and presses on the door (102). This secures the lock (100) to the door (102). FIG. 1A also designates two sides of the door (102). The side of the door that includes (e.g., is proximate) the catch (110) and door jamb (104) is called the "catch side" or the "jamb side" of the door as shown in FIG. 1A. The opposite side of the door is labeled as the "release side of the door". The door is considered "closed" when the leading surface (226) of the door passes the edge (228) of the door frame. In other words, the door is "closed" when at least a portion of the edge of the door is opposite the door frame and the door frame gap (105) has at least partially formed. A door is considered "fully closed" when the standard latch on the door that is controlled by the door knob is engaged with the strike lock or other feature of the door frame and is securing the door closed.

This lock, and other examples shown herein, may have a number of benefits. These benefits may include, but are not limited to, a lock that is easily installed, does not damage the door, allows the door to fully close when the lock is engaged, and allows an adult (or other person with sufficient reach) to open the lock from either side of the door. In some examples, the lock does not require any alteration to the door or door frame to fully function. This means that there are no screws, adhesive strips that could potentially remove paint, and no holes or other damage to the door are made when installing the lock. However, if additional means are necessary to install the lock securely, then some damage to the door may occur. The lock may also be freely positionable along the perimeter of the door, both along the vertical edge of the door and the top of the door. In some examples, there may be locks that are used along the bottom of the door or on the hinged side of the door.

Figure 1B:
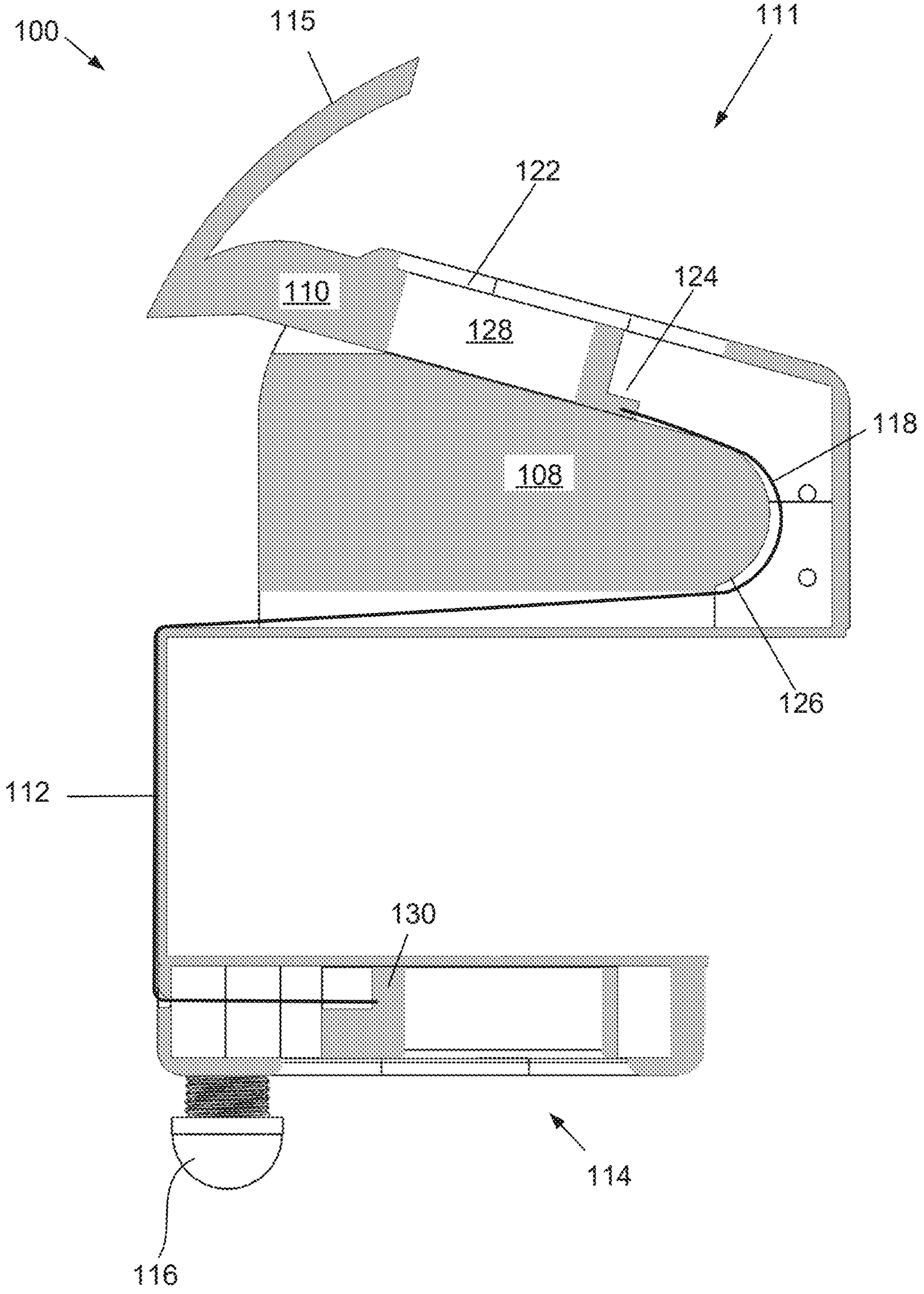

FIG. 1B shows a cutaway view of an illustrative instance of a lock (100) showing the ribbon (118) connected to each side of the lock (100). The lock (100) in this example includes the catch (110), the catch body (108), the U bracket (112), the release body (114), the screw (116) and the ribbon (118) that is attached from the catch (110) and passes around the catch body (108) through the U bracket (112) and down to the release body (114). The ribbon (118) which is attached to both ends of the lock (100) functions as a communication channel or connection within the lock (100) mechanism. In this example, the ribbon (118) mechanically communicates the position of a release slider (130) within the release body (114) to the catch (110) that slides within the catch mechanism (111). To do this, the ribbon (118) is mechanically attached to the release slider (130) and is tensioned when the release slider (130) is manually moved away from the screw (116). This tension causes the ribbon (118) to slide (e.g., the ribbon (118) may be slidably movable) along the U bracket (112) and around interior features of the catch body (108) which re-orient the tension on the ribbon (118) to retract the catch (110) into the catch body (108). These interior features may include a guide surface (126). The ribbon (118) is connected to the catch (110) at a ribbon attachment (124). The catch (110) may be retracted manually from the catch side of the door in one of several ways.

In this example, the catch body (108) includes an access opening (122) which exposes a finger hole (128) in the catch (110). A user can insert a finger through the access opening (122) and engage with the finger hole (128) to slide the catch (110) away from the door frame (106) and door jamb (104), thereby disengaging the catch (110) from the door frame (106)/door jamb (104). This motion may be opposed by one or more springs that tend to force the catch (110) to extend. Additionally or alternatively, the user may directly interface with the catch (110) to push it back into the catch body (108). For example, the user could press on the curved instance or portion of the ramp (115) of the catch to disengage it from the door jamb (104).

Similarly, the catch (110) of the lock (100) may be disengaged from the release side of the door. On the release side, the user can place their finger(s) or thumb through the access opening (122) and into the finger hole (128) of the release slider (130). The user then moves the release slider (130) away from the screw (116), thereby pulling/tensioning the ribbon (118) and causing it to slide backward with the release slider (130). The tensioned ribbon (118) slides along its length and pulls the catch (110) into its retracted position.

Attachment of the lock (100) to the door (102) can be accomplished in a variety of ways, including methods that do not require tools or damage to the door (102). However, in some designs and circumstances, it may be desirable to use tools, fasteners, and/or adhesives to more securely attach the lock (100) to the door (102). The use of tools, fasteners, adhesives, or other attachment strategies may allow for reduced complexity in the design and lower strength requirements for the various components. In the illustrative design shown in FIG. 1B, the lock (100) can be attached and detached from the door (102) by turning the screw (116) in a clockwise or counterclockwise direction without damaging the door (102).

Figure 1C:
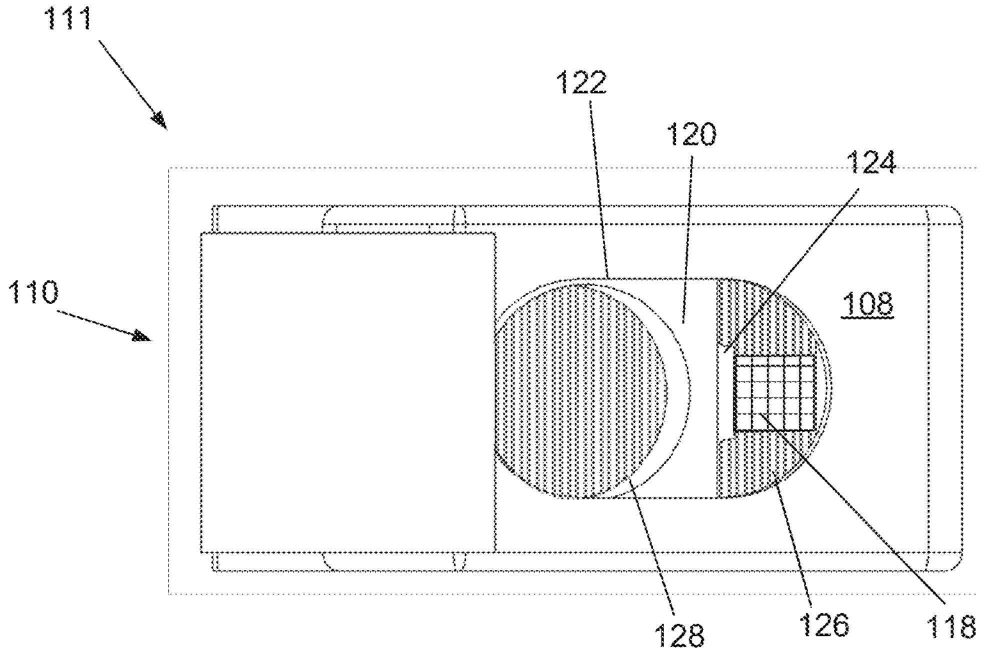

FIG. 1C shows a top view of an illustrative catch mechanism (111) of the lock (100). The catch mechanism (111) includes the catch (110), the catch body (108), the ribbon (118), the catch slider (120), the access opening (122), the ribbon attachment (124), the guide surface (126), and the finger hole (128). The catch (110) is connected to the ribbon (118) within the catch body (108) ensuring that it can be opened from both sides of the door (102). The ribbon (118) is placed over the guide surface (126) connecting to the other side of the lock (100). As discussed above, the catch slider (120) within the access opening (122) is also visible on top of the catch body (108) to enable the user to place a finger in the finger hole (128) and pull the catch (110) to open the door (102, FIG. 1A).

Figure 1D:
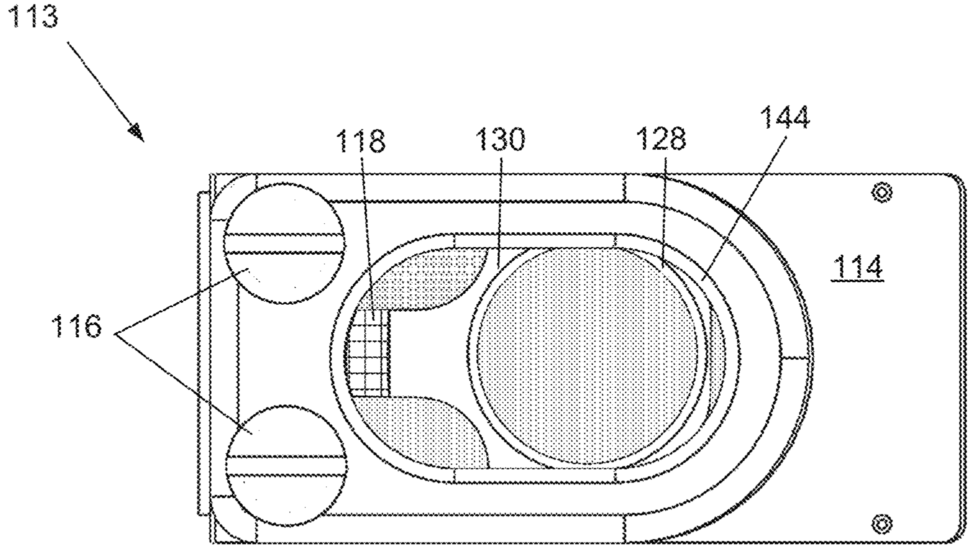

FIG. 1D shows a bottom view of the release mechanism (113) of the lock (100, FIG. 1A). The release mechanism (113) includes the release body (114), screws (116), the release opening (144), the finger hole (128), the release slider (130) and the ribbon (118). The release body (114) is securely placed using the screws (116) to tighten the grip around the door (102, FIG. 1A). The release opening (144) is situated within the release body (114) to access the release slider (130) which is connected to the ribbon (118). As discussed above, the user's finger can be placed in the finger hole (128) and pull the release slider (130) to open the door (102, FIG. 1A) from the other side.

Figure 1E:
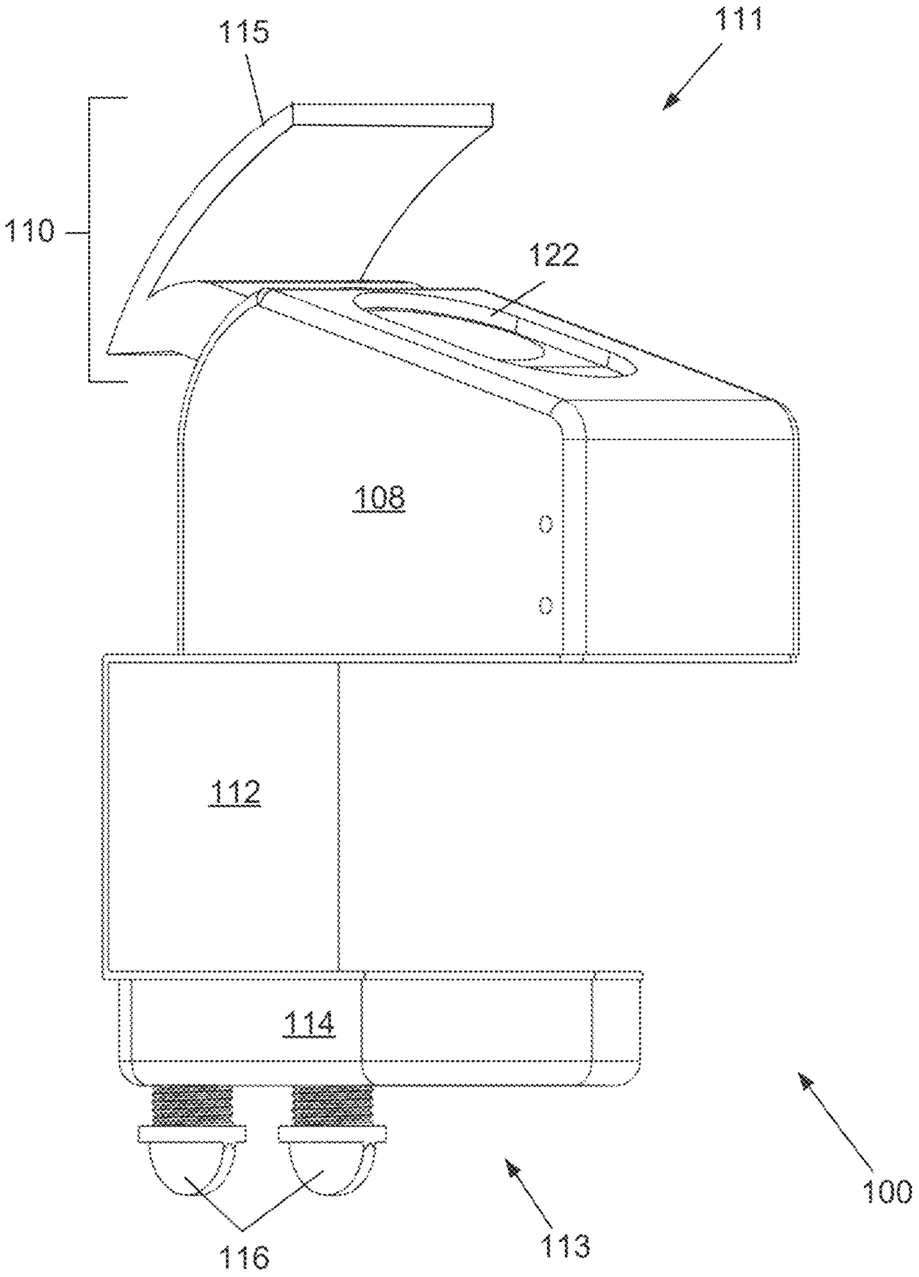
Figure 1F:
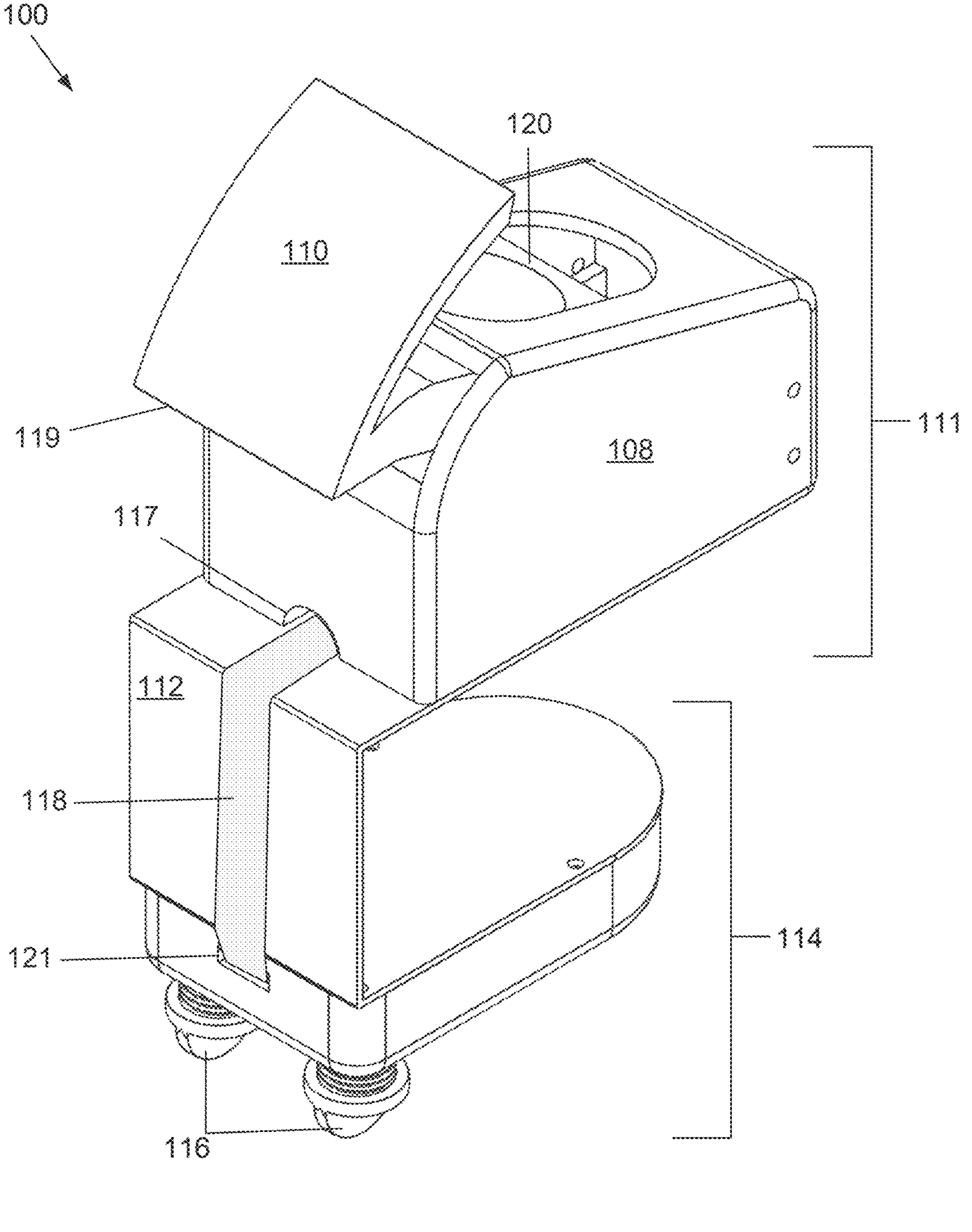
Figure 1G:
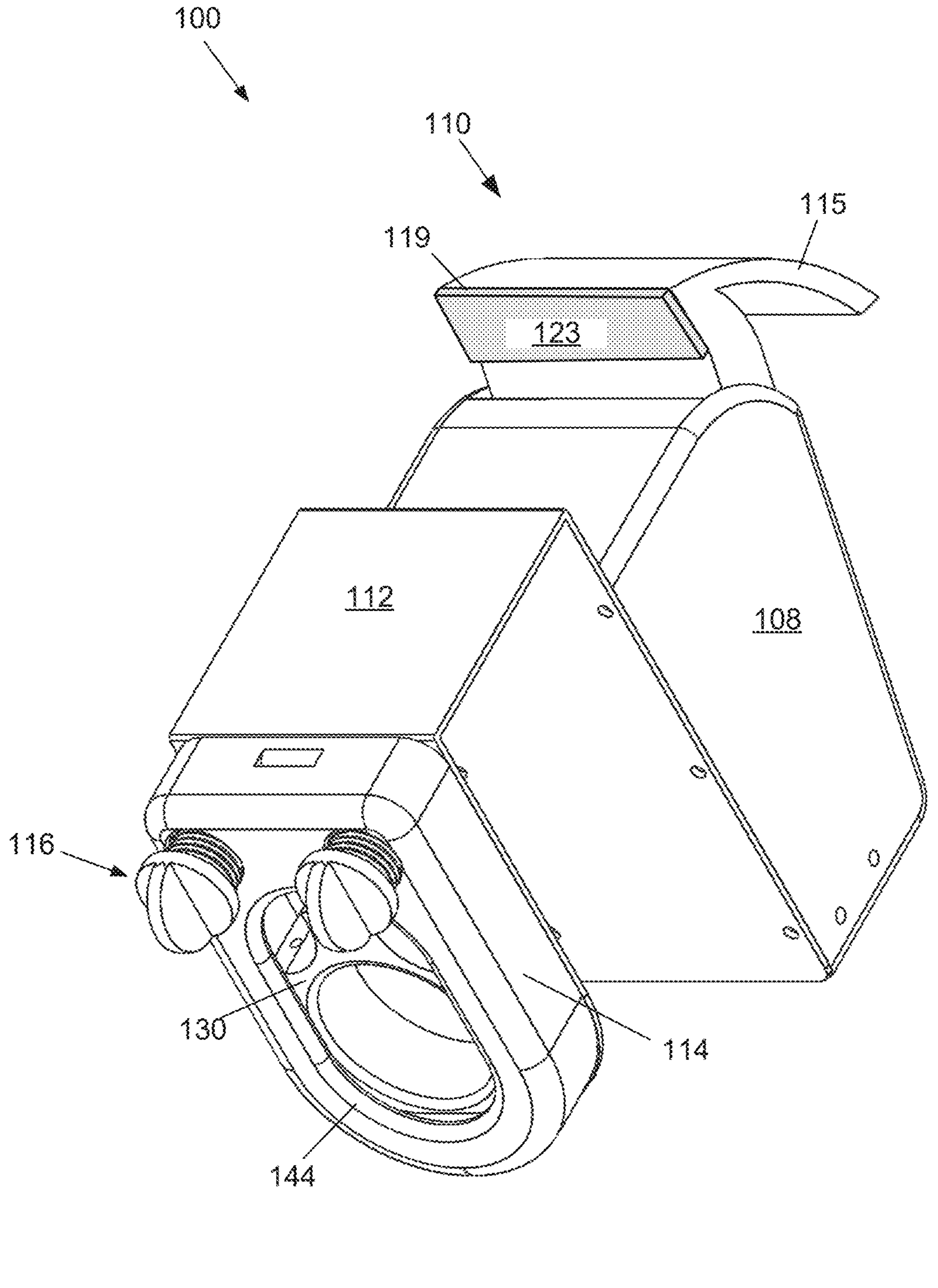

FIGS. 1E, 1F and 1G are different perspective views of the lock (100) and show various aspects of this illustrative design. As discussed above, this embodiment of the lock (100) includes a release mechanism (113) with a release body (114) and two screws (116). The U bracket (112) connects the release mechanism (113) to the catch mechanism (111). The catch mechanism (111) includes the catch body (108), the access opening (122), and the catch (110). The catch (110) includes a ramp (115). The ramp (115) is designed to engage with the door frame (106, FIG. 1A) and door jamb (104, FIG. 1A). As the ramp (115) slides over the door frame (106, FIG. 1A) and the door jamb (104, FIG. 1A), it forces the catch (110) to retract, thereby allowing the door (102, FIG. 1A) to swing shut. When the catch (110) reaches the space behind the door jamb (104, FIG. 1A), it may automatically extend to engage with the back surface of the door jamb (104, FIG. 1A) and lock the door (102, FIG.

1A) in place. FIG. 1F additionally shows two openings (e.g., a tab (117) and an additional opening (121)) that allow the ribbon (118) to pass through the catch body (108) and release body (114), respectively. Also shown is the catch edge (119) of the catch (110). The catch edge (119) of the catch (110) can be used to engage with the door jamb (104, FIG. 1A) and may be particularly useful in gripping door jamb profiles that have low surface areas and/or sloped surfaces (see e.g. FIGS. 13A-13E).

FIG. 1G shows an illustrative embodiment of the lock (100) that shows a catch (110) that includes a gripping pad (123) that forms the contact surface of the catch (110). In some embodiments, the gripping pad (123) may extend to the catch edge (119) of the catch (110). The gripping pad (123) may be made from any of a variety of materials and may be connected to the catch (110) in a variety of ways. For example, the gripping pad (123) may be made of rubber, silicone, plastic, metal or other appropriate materials, with any number of surface textures. The gripping pad (123) may be adhered to the catch (110), insert molded into the catch (110), or mechanically joined to the catch (110), or joined using any other appropriate technique. The ramp (115) of the catch (110) is also shown.

Figure 2C:
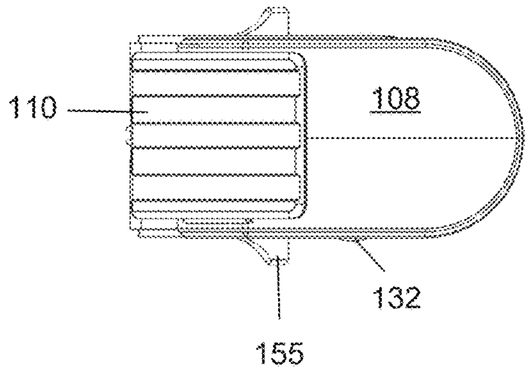
FIGS. 2A-2I show various views of another illustrative lock, according to one example of principles described herein.
Figure 2B:
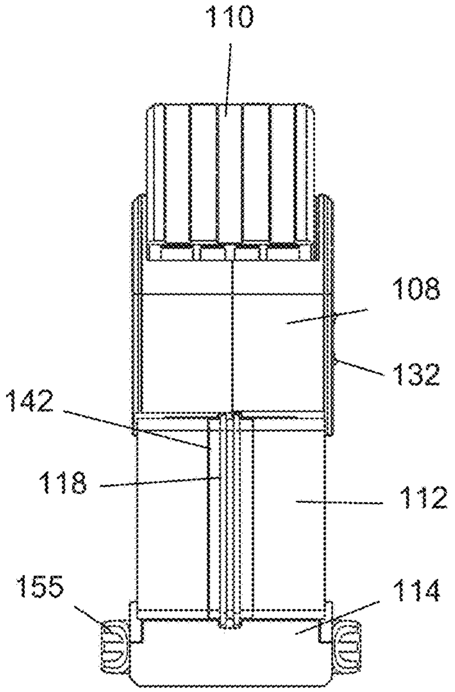
Figure 2A:
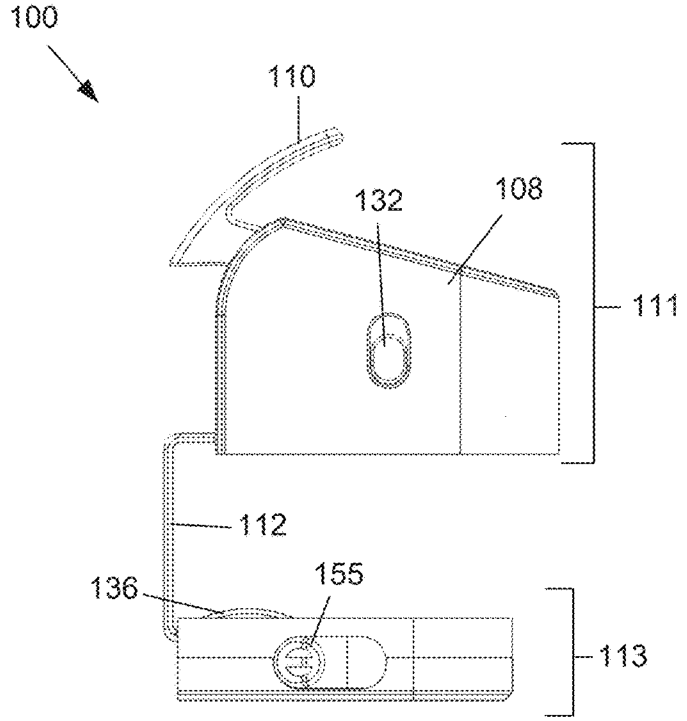
Figure 2D:
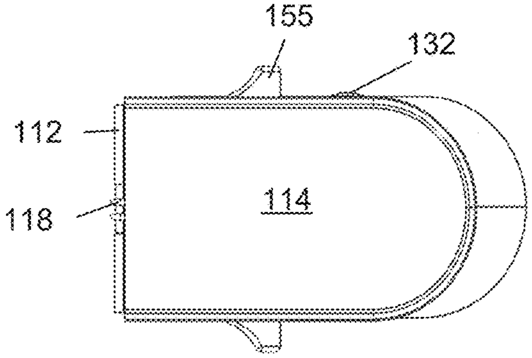
Figure 2E:
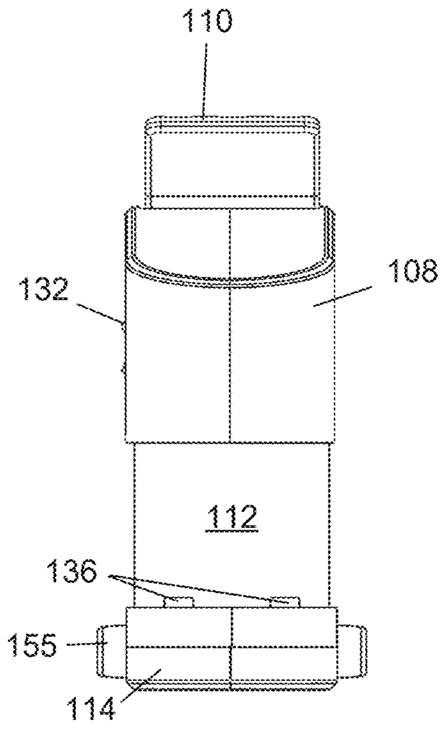
Figure 2F:
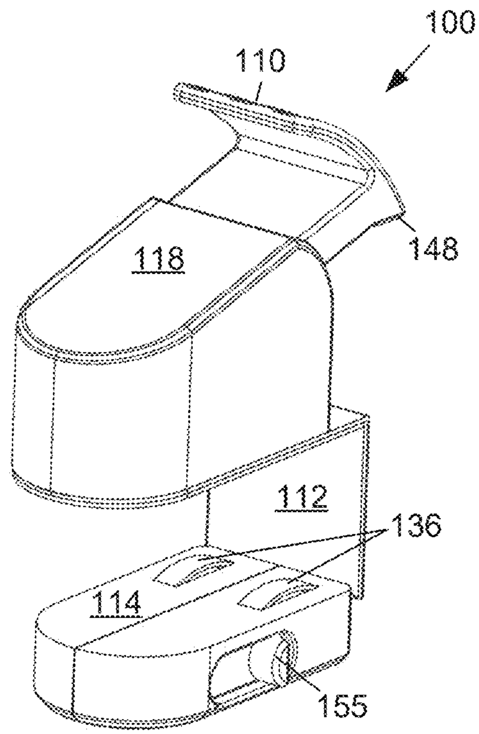
Figure 2G:
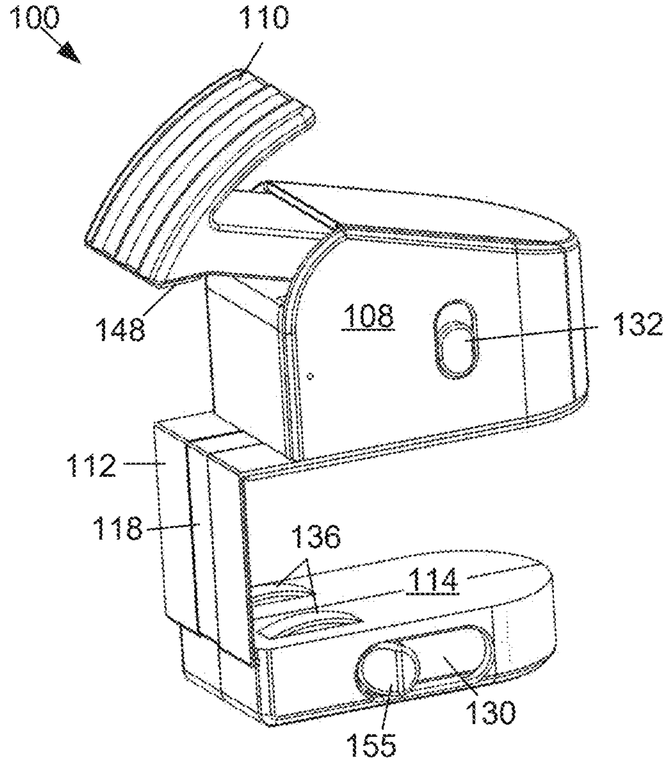
Figure 2H:
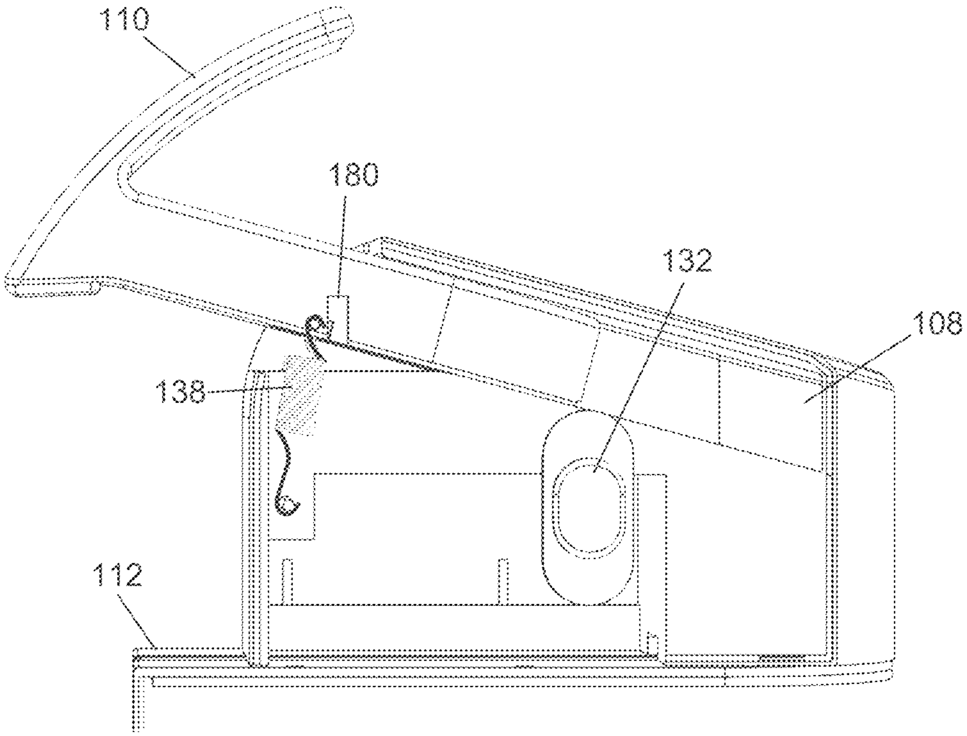
Figure 2I:
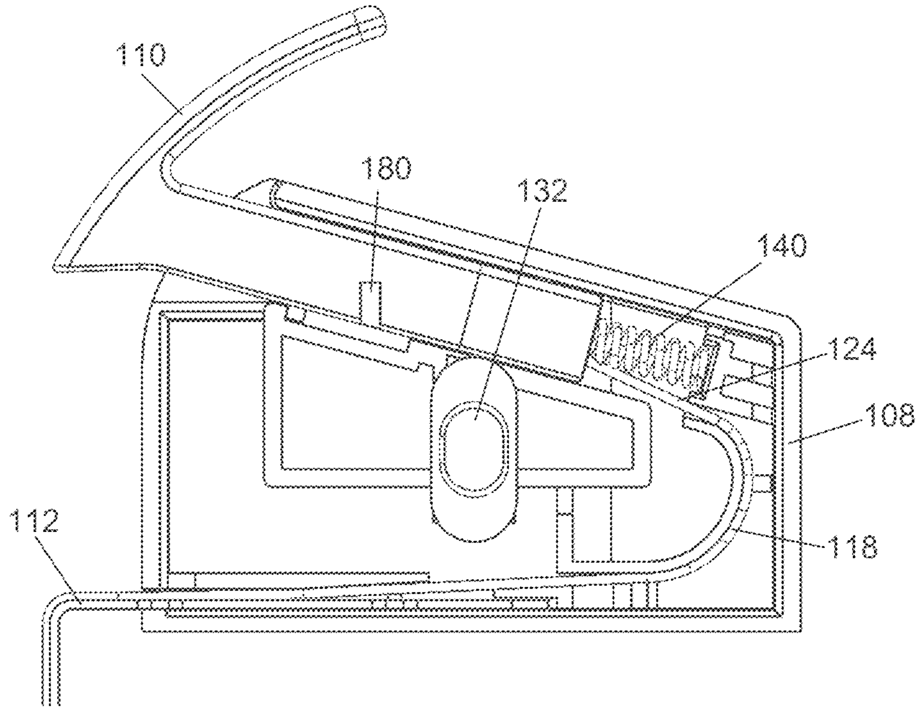

FIGS. 2A-21 show various views of one example of a lock (100). FIG. 2A shows a side view of the lock (100), FIG. 2B shows a front view, FIG. 2C and FIG. 2D are top and bottom views, respectively. FIG. 2E is a rear view of the lock and FIGS. 2F and 2G are perspective views. FIGS. 2H and 2I are cross sectional views of the catch mechanism (111) that show internal structures.

These figures show a catch mechanism (111) that is connected to a release mechanism (113) by a U bracket (112). In this example, the catch mechanism (111) includes a catch (110), a catch body (108), and a catch lock (132). The release mechanism (113) includes a release body (114), a release slider (130) with integral finger posts extending through apertures in the sides of the release body (114) and spring ramps (136).

The U bracket (112) in this example includes a groove (142) and a number of cables or ribbons (118) that form the communication connection between the catch and the release slider.

In at least one implementation, the catch body (108) can include a catch lock (132) on the side. The catch lock (132) can be utilized to lock the catch (110) in place in order not to engage the door jamb (104, FIG. 1A). This, however, is only one illustrative embodiment. The catch lock (132) could have a variety of different configurations and designs. For example, the catch lock may be implemented as a push button rather than a slider. The push button may be located in a variety of locations and surfaces. In one embodiment, the push button may be located on the top surface of the catch body and may be used both to engage and to disengage the catch lock.

There are a variety of configurations that can apply forces that tend to force the catch to extend. In FIG. 2H, a tension spring (138) is attached over a post on the catch body (108) and a posts to the catch (110). Thus, when the catch (110) is forced back into the catch body (108), the tension spring (138) extends and tends to return the catch (110) to the extended position. Also shown in FIG. 2H is a catch lock (132) and an indent (180) or notch that the catch lock (132) can engage to lock the catch (110) in the retracted position.

FIG. 2I shows an alternative embodiment in which the tension spring (138, FIG. 2H) is replaced by the compression spring (140). In this example, a portion of the compression spring (140) is contained within the interior of the catch (110) and the opposite end is supported by the catch body (108). When the catch (110) is pushed back into the catch body (108), the compression spring (140) compresses and tends to force the catch (110) back out of the catch body (108). As discussed with respect to other figures, this spring loaded catch design allows the catch to retract when the door is closing and the ramp of the catch engages with the door or door jamb. However, once moving past the door jamb, the catch automatically extends and engages with the door jamb, thereby preventing the door from opening until the catch is retracted. The catch may be retracted in a variety of ways. For a user on the catch side of the door, the catch may be manually pushed backward using a finger hole as shown in FIGS. 1A-1G or directly pushing the catch back by pressing on the manual ramp. From the other side, the catch may be disengaged by pressing on the finger posts to move the release slider backwards, putting tension on the ribbon and cause the catch to retract.

FIG. 2I also shows the ribbon (118) and/or cable passing around internal structures in the catch body (108) and being fastened/connected to the catch (110) such that when the ribbon (118)/cable (206) is tightened the catch (110) tends to retract, thereby allowing the door to be opened.

Figure 3A:
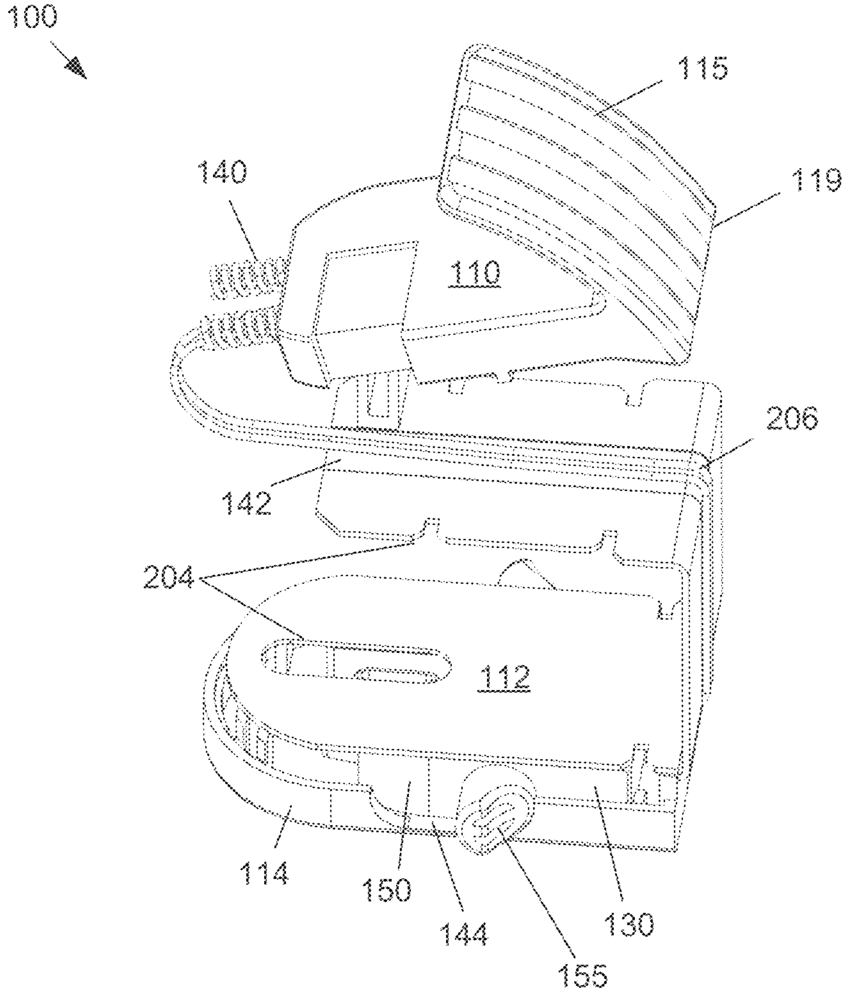
FIGS. 3A-3F show various internal and external aspects of an illustrative lock, according to one example of principles described herein.

FIGS. 3A-3F show various partial and cross sectional views of the lock (100) to illustrate exemplary internal components. FIG. 3A shows the lock (100) without the catch body (108, FIG. 1A) and with the inside half of the release body (114). This exposes the internal components of the lock (100).

FIG. 3A shows the catch (110) with compression springs (140) extending rearward. These compression springs (140) tend to urge the catch (110) forward into the extended position. Stops within the catch body (108, FIG. 1A) interact with the catch (110) to prevent it from extending beyond a specific point. The automatic extension provided by the compression springs (140) may serve a number of functions including automatic latching of the door (102, FIG. 1A) when it is closed. The compression spring (140) may also provide force that drives the catch edge (119) of the catch (110) to positively engage with the door jamb (104, FIG. 1A). In some designs there may be residual force exerted by the compression springs (140) when the catch (110) is fully extended and engages with the stops in the catch body (108, FIG. 1A). This may provide a number of benefits, including keeping the catch (110), compression springs (140), or other components from rattling when the lock (100) is not engaged and providing force that tends to keep the catch (110)/catch edge (119) engaged with the door jamb (104, FIG. 1A). This can be particularly useful when the door jamb (104, FIG. 1A) has a small engagement area and/or a sloped or curved profile. These profiles are further described with reference to FIGS. 13A-13F.

Figure 3B:
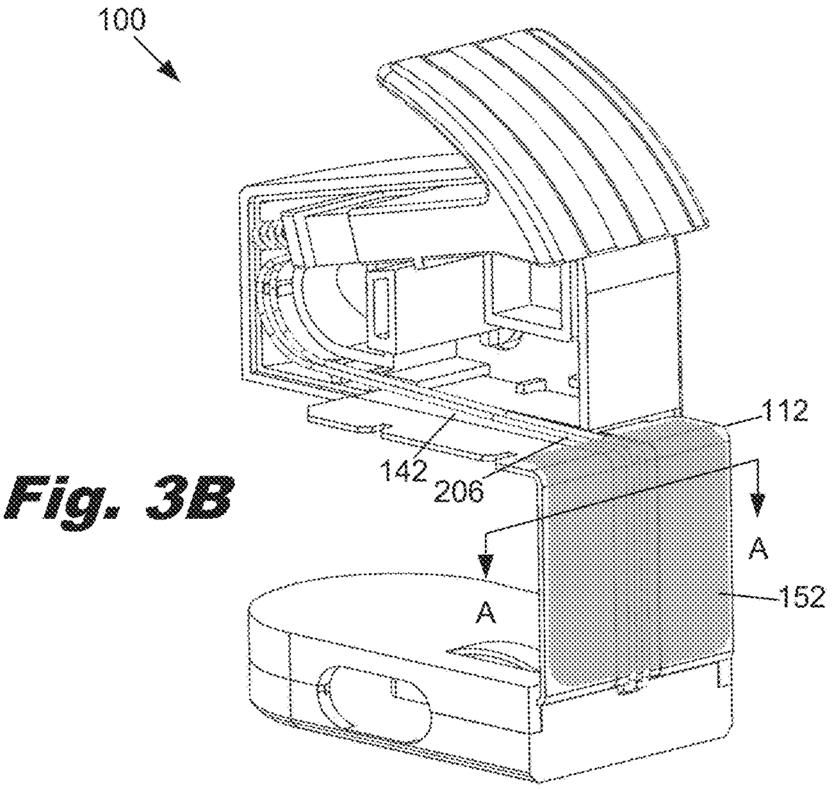

In FIG. 3A, the communication connection is a cable (206) instead of ribbon (118, FIG. 3B). The cable (206) may have a number of advantages, including price, ease of attachment, and flexibility. It also may have some disadvantages, including concentrated wear/forces under the cable (206), relatively high profile cross section, and the tendency for unpredictable motion/buckling when the cable (206) is not in tension. The unpredictable motion and buckling can become an issue if the cable (206) becomes tangled in the internal components of the device or wedged into a crack and prevented from motion. Even if the mechanism design is such that the cable (206) or ribbon (118, FIG. 1B) should always be in tension, there may be dynamic effects that may put the ribbon (118, FIG. 1B)/cable (206) into a compression state. For example, if the lock (100) is placed over a door edge and the door (102, FIG. 1A) is slammed shut, the rapid motion of the catch (110) as the ramp (115) of the catch (110) engages with the door frame (106, FIG. 1A) and door jamb (104, FIG. 1A) may cause slack in the cable (206) or ribbon (118, FIG. 1B).

In the example shown in FIG. 3A, there are two cables (206) or a single instance of a cable (206) that is doubled. This is only one example and there are many embodiments that could be used to address shortcomings of cables (206). The cables could be made from a variety of materials, including but not limited to monofilament cords, threads, strings, miniature steel cables, synthetic fibers, coated wires, flexible shafts, braided stainless steel wires, shape memory alloys or any other desired cable-like materials. These cables could have a variety of geometries and cross sectional shapes. For example, the cables could have non-round profiles to help the high profile cross section and buckling. A rectangular cable could be stronger, have more predictable buckling, and a lower profile than a cable with a circular cross section. Additionally or alternatively, cables could be incorporated into various ribbon designs. For example, the ribbon may simply support the cables and hold them in a spaced relationship while the cables provide most of the tensile strength needed for the function of the mechanism.

The U bracket (112) is shown in FIG. 3A and may have a number of features (e.g., a groove (142) and/or some other feature (204)) that facilitate its function. In one embodiment, the U bracket (112) may have an indentation or groove (142) running along all or part of its length. This indentation or groove (142) may have a number of functions, including providing a channel for the cable (206) or ribbon (118, FIG. 1B) to travel through and protecting the cable (206) or ribbon (118, FIG. 1B) from being pinched between the door (102, FIG. 1A) and the door frame (106, FIG. 1A). This allows for the smooth and unobstructed motion of the cable (206) or ribbon (118, FIG. 1B) and for the smooth operation of the mechanism. Other features (204) may include a variety of notches and cutouts to help secure the bracket in the catch (110) and release body (114), to guide/position various moving components, and in some cases to provide spring/holding force that will help secure the lock (100) over the door (102, FIG. 1A).

The bottom of FIG. 3A shows various components of the release body (114), including the release slider (130), the finger posts (155) or pegs that extend out the release opening (144) and the slider housing (150). In some cases, it may be desirable for the release opening (144) to be completely covered by the slider housing (150) so that a user cannot see into the interior of the release body (114). This may prevent objects or debris from entering the release body (114). It may also prevent the user's fingers, hair, jewelry, or other objects from being trapped or pinched in the mechanism. In some embodiments, there may be thin and flexible fins molded along the side of the release slider (130) that cover portions of the release opening (144) when the release slider (130) is all the way forward and deflect inside the slider housing (150) to provide restoring spring force that pushes the release slider (130) forward when it is manually pushed rearward. Additionally or alternatively, the release opening may be covered by a flexible and resilient film.

FIGS. 3B-3F focus on structure and functions of portions of the lock (100) that are sandwiched between the door and the door frame and the door and the door jamb. As discussed above with respect to FIG. 1A and below in FIG. 14, the door frame gap (105) between the door and the door frame, and the door jamb gap (107) between the door and the door jamb vary between door installations. For poorly installed or poorly maintained door installations, the door frame gap (105) and/or the door jamb gap (107) may be nonexistent (e.g. the door is rubbing on the frame or the door will not latch because the door contacts the door jamb too soon) or very wide. However for typical doors, the door frame gap (105) and/or the door jamb gap (107) are on the order of millimeters, with well installed doors having a door frame gap (105) and/or a door jamb gap (107) that are between 1-5 millimeters. Consequently, for the lock (100) to have wide compatibility with various door installations, the lock (100) structure that resides in the door frame gap (105) and/or the door jamb gap (107) should have minimal thickness. In some lock embodiments this thickness is less than a millimeter. In other embodiments the lock (100) structure that resides in the door frame gap (105) and/or the door jamb gap (107) may be between 1-2 millimeters in thickness or more. In situations where the door frame gap (105) is small, it can be desirable for the ribbon (118) or cable (206) not to be pinched. This can significantly increase the friction on the ribbon (118) or cable (206) and prevent it from moving smoothly (or at all). Consequently, it can be desirable for the structure of the lock (100) surrounding the ribbon (118)/cable (206) to prevent the ribbon (118)/cable (206) from being pinched. It can also be desirable to control the surfaces that the ribbon (118) or cable (206) travels over. Ideally these surfaces would be smooth and low friction. However, if the ribbon (118) or cable (206) is exposed, it may come into contact with surrounding materials, such as the door, door frame, or door jamB. These surfaces may not be smooth or low friction and may damage the ribbon (118) or cable (206). Consequently, in some embodiments, it may be desirable for the ribbon (118)/cable (206) to be enclosed.

Figure 3C:
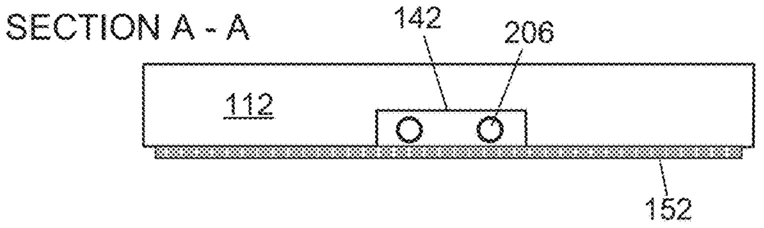

FIG. 3B shows a doubled cable (206) in a groove (142) in the U bracket (112). Where the groove (142) and the cable (206) are exposed and pass through the gaps (the door frame gap (105) and/or the door jamb gap (107), FIG. 1A), a covering (152) is placed over the groove (142) and cables. Section A-A shows a cross section of the U bracket (112) structure and is shown in FIG. 3C. In FIG. 3C the U bracket (112) cross section shows that a groove (142) has been formed in it and the cables (206) are in the groove (142) and slide in the groove (142) when the release mechanism is actuated. A covering (152) such as a film or sticker is placed over the face of the U bracket and covers the groove (142). This encloses the cables (206) and forms a closed and protected channel for the cables (206)/ribbon (118) to slide through.

Figure 3D:
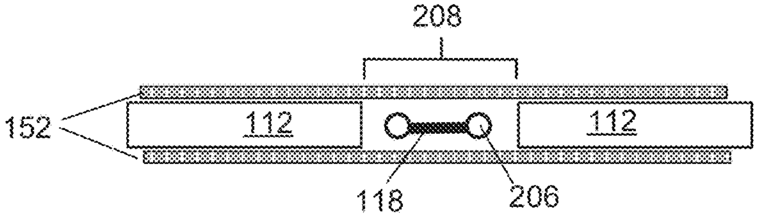

FIG. 3D shows a cross section of an alternative embodiment where the U bracket (112) includes a cutout section (208). In this example, the cutout section (208) is in the middle of the U bracket (112) and passes entirely through the U bracket (112). For example, if the U bracket (112) is formed from sheet metal, the cutout section (208) could be a stamped hole in the sheet metal. FIG. 3D shows that the cutout section (208) is enclosed on both sides by coverings (e.g., a sticker (152)) and that a composite instance of a ribbon (118) passes through the cavity that is formed by the cutout section. In this example, the composite instance of the ribbon (118) includes cables (206) that are joined with a ribbon (118) or other structure between them. This composite instance of the ribbon (118) may have a number of advantages, including having the cables (206) protect the edges of the ribbon (118) from damage, and the ribbon (118) keeping the cables (206) together and free from tangling.

Figure 3E:
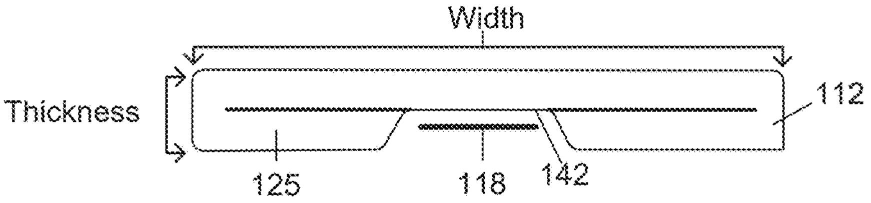

FIG. 3E shows an alternative structure where the U bracket (112) is formed from folded material. For example, if the U bracket (112) was formed from folded sheet metal, the sheet metal may be folded along the edges, with the folded portion (125) not extending all the way to the middle of the center piece. This leaves a channel running down the length of the U bracket (112) and a ribbon (118) can be disposed in, and slide through, this channel. A covering (see e.g., a sticker (152), FIG. 3D), such as a film or sticker is not shown in this embodiment, but may still be used.

Figure 3F:
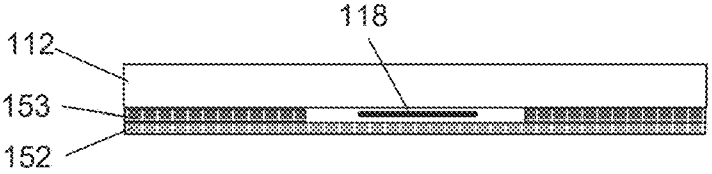

FIG. 3F shows a U bracket (112) cross section that has a multilayer structure on one side, with a first spacer layer (153) creating a gap in the center of the structure and a second covering layer (e.g., a sticker (152)) creating an enclosed space for the ribbon (118) to slide through. The spacer layer may be formed from a variety of materials, including stickers, double sided adhesive, or other appropriate film or sheet materials. In each of these embodiments, the stickers/layers serve a dual function: they shield the ribbon (118) from inadvertent adhesion to external elements such as the door and the door frame and they keep the ribbon or cable in place to ensure reliable function. By shielding the ribbon/cable from inadvertent contact with external elements, the risk of undesirable damage to the ribbon/cable is reduced. By keeping the ribbon or cable in place, the risk of tangling or catching is reduced.

Several considerations may be important when considering the design of the structure passing through the gaps. First, the entire structure may have a relatively thin cross section while maintaining sufficient rigidity and resilience to keep the lock securely on the door. Thus, the U bracket structure may be formed from metal such as stainless steel and various steel alloys. Some examples of materials that may be appropriate include 304 stainless steel and higher carbon steels such as 1095 steel. In some embodiments it may be helpful to use spring steels and/or higher carbon steels for increased stiffness and spring force. As shown in FIG. 3E, the thickness of the entire structure may be on the order of millimeters, with 1-2 millimeters acceptable and a goal of being one millimeter or less. However, in some situations, such as locks that are connected on the top or bottom edge of the door where there may be wider clearances, the U bracket may be much thicker. The width of the bracket is not tightly constrained and can range between 10-100 millimeters or more in some designs, with around 50 millimeters being a typical width.

Forming the groove or channel can be challenging to do in a cost effective manner. Machining a very shallow groove can be challenging and time consuming. For example, machining a 0.5 mm deep groove in 1 mm thick material may require special fixturing and stamping techniques to ensure that the sheet metal is flat and held securely. Consequently other designs, such as those shown in FIGS. 3D and 3F may be more cost effective but may not have the same performance as the machined part.

It can also be desirable for the groove or channel through which the ribbon passes to be free from sharp edges or adhesive. For example, the grooves in FIGS. 3C, 3D, and 3F are formed from metal and may have rough or sharp surfaces and edges. Consequently it may be desirable for the ribbon/cables to be positioned along the middle of the groove/channel and have minimal or no interaction with the edges of the groove. Additionally it may be desirable to have no adhesive present in the channel. For example, if the covering films are formed from stickers or other films that have adhesive, it may be desirable for the adhesive portions to be well away from the channel to prevent the ribbon or cable from being "gummed up" by the adhesive. For all the difficulties, the groove or channel serves several significant functions: protecting the ribbon, keeping it from getting pinched, and serving as a guide to keep the ribbon from going off track (e.g., the ribbon may be bounded by the groove or channel).

Figure 4C:
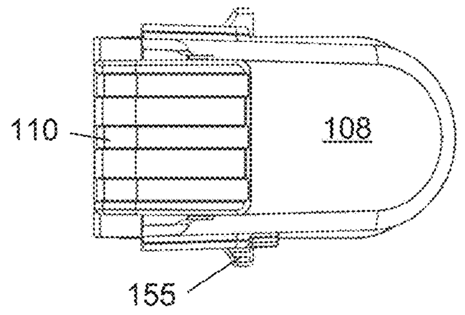
FIGS. 4A-4L show views of an alternative lock design, according to one example of principles described herein.
Figure 4B:
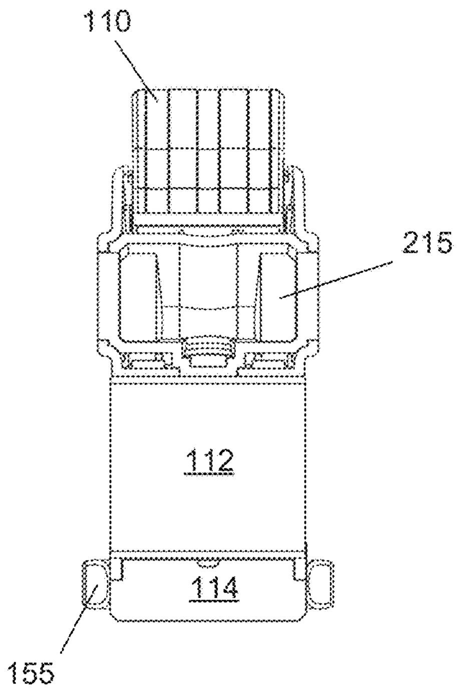
Figure 4A:
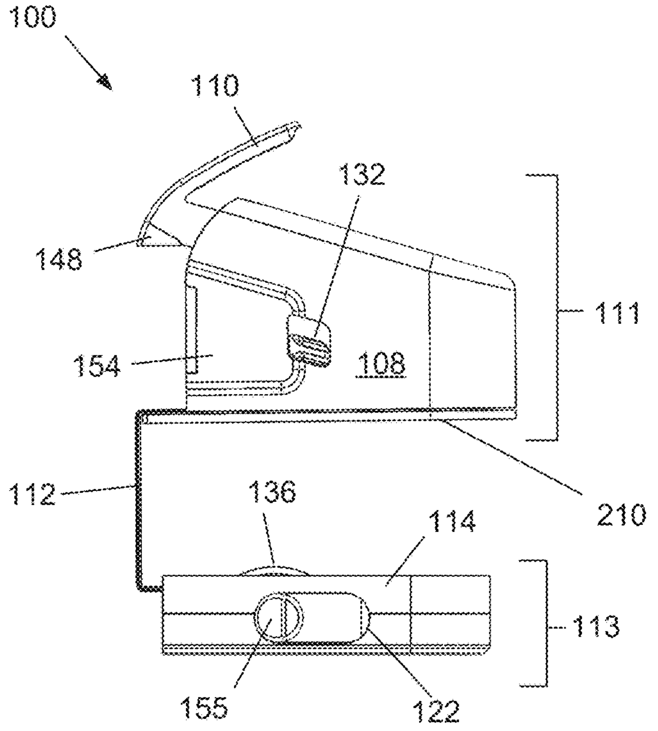
Figure 4D:
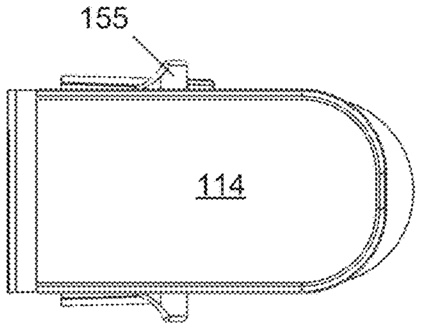
Figure 4E:
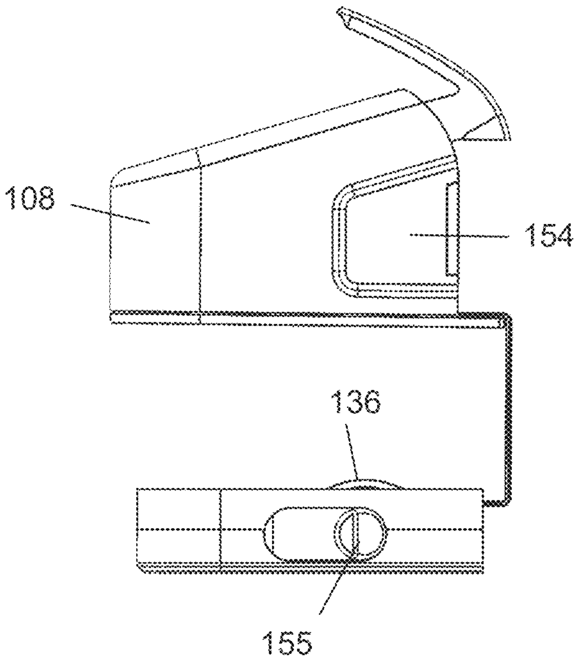
Figure 4F:
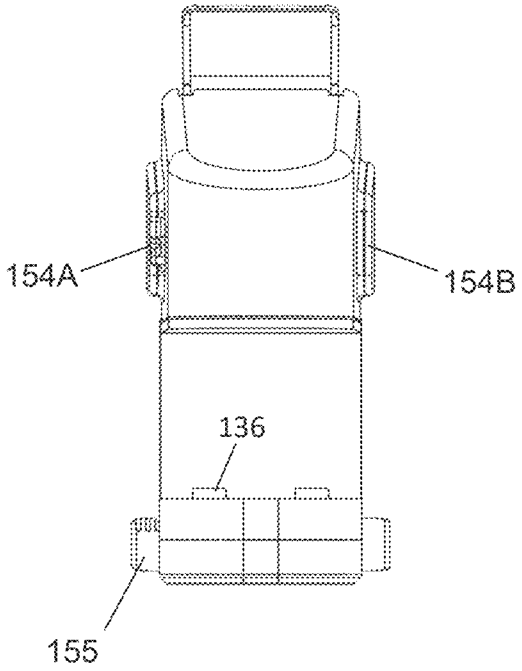
Figure 4G:
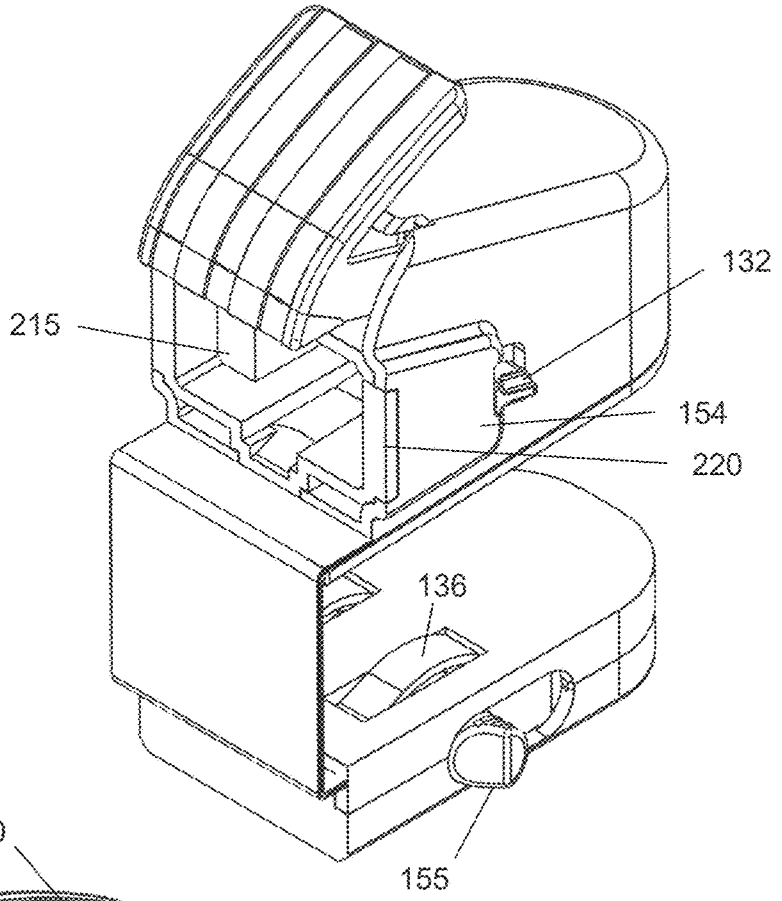
Figure 4H:
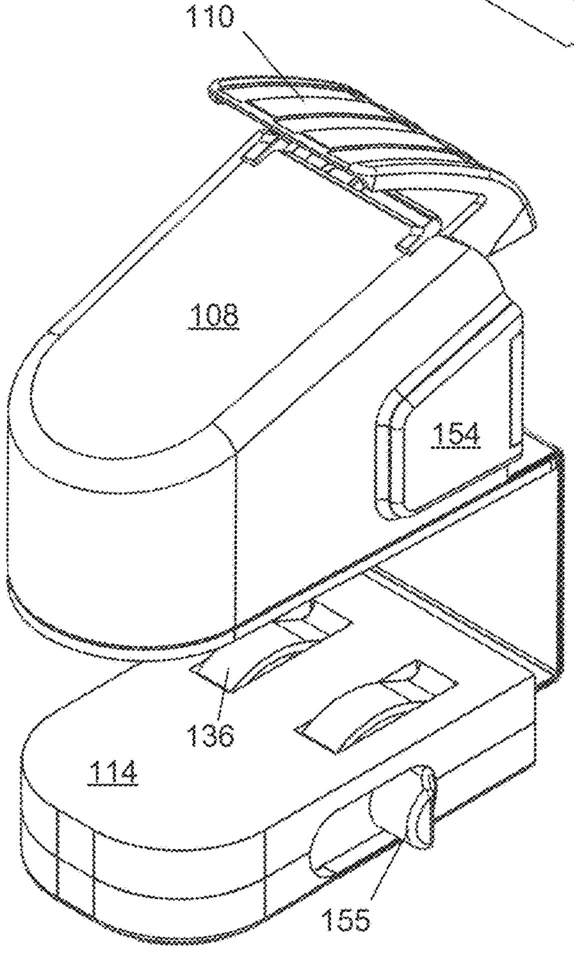
Figure 4I:
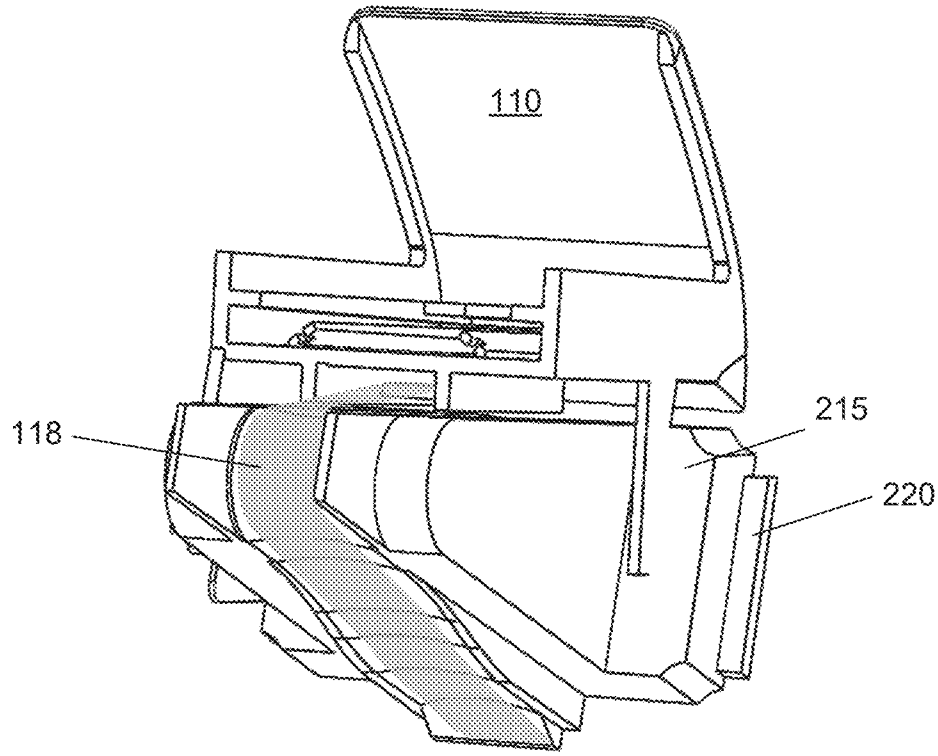
Figure 4J:
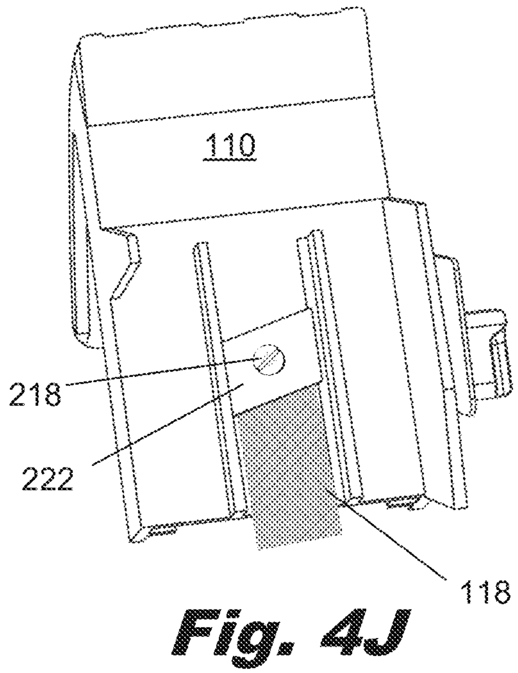
Figure 4K:
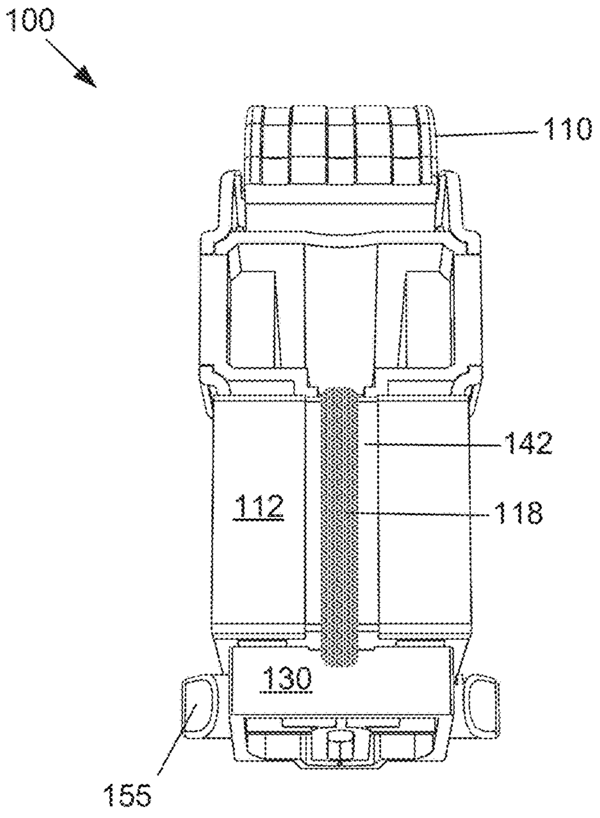
Figure 4L:
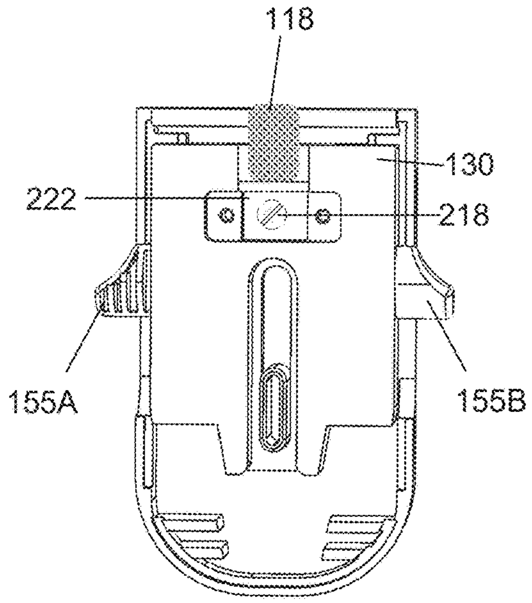

FIGS. 4A-4L show various views of one example of a lock (100). FIG. 4A shows a right side view of the lock (100), FIG. 4B shows a front view, FIG. 4C and FIG. 4D are top and bottom views, respectively. FIG. 4E is a left side view, and FIG. 4F is a rear view. FIGS. 4G and 4H are front and rear perspective views, respectively. FIGS. 4I and 4J are internal views of components within the catch mechanism (111). FIGS. 4K and 4L are diagrams showing the interaction of the ribbon (118) with the release mechanism (113).

These figures show a lock (100) that includes a catch mechanism (111) and a release mechanism (113) that are connected by a U bracket (112). Although the U bracket (112) is shown in some figures as a "U" shaped bracket, the bracket may have any number of alternative shapes and sizes. For example, the bracket may be "L" shaped and pass through the gaps in the door without having a third side. In some embodiments, the bracket may have additional curves or other geometries. There may be multiple brackets that work together. For example, a plastic piece may have multiple metal components connected to it to provide additional strength and resilience. Additionally or alternatively there may be two different brackets with a gap between them for the communication connection to pass. A variety of other configurations may also be realized while implementing the principles described herein.

As discussed above, the release mechanism (113) may include finger posts (155) traveling in an access opening (122) in the release body (114). In some embodiments the release body (114) may also include one or more spring ramps (136). These spring ramps (136) may serve to tighten the grip of the lock (100) on the door as the lock (100) is seated on the edge of the door. However, in some embodiments, the spring ramps (136) are not used and the resiliency of the U bracket (112) is relied on to impart the required normal force to secure the lock (100) to the door.

The catch mechanism (111) may include a catch body (108), a catch (110), a catch lock (132). In this example, the catch (110) includes a catch tip (148) that may be formed from a different and more grippy material. For example, the main portion of the catch (110) may be formed from a tough and low friction plastic such as ABS. However, this plastic may be unsuitable for gripping the door jamb. Consequently different material could be used for the catch tip (148). In one example, a separate piece may be molded out of an elastomeric and high friction material and mechanically and/or adhesively joined to the main portion of the catch (110). Alternatively, insert or dual molding may be used to connect the elastomeric material. This may form a catch tip (148) that has superior gripping power and is supported by the stiffer body of the catch (110). For example, the catch tip (148) materials can include silicone, thermoplastic elastomers, polyurethane, neoprene, EPDM (Ethylene Propylene Diene Monomer), nitrile, vinyl, leather, foam or any other desired elastomeric materials.

As discussed above and further discussed with respect to FIGS. 9A and 9B, the lock (100) may include a catch lock (132). This catch lock (132) may have a variety of configurations and exterior profiles. In this example, the catch lock (132) has at least one exterior rib that facilitates manual manipulation by a user. This design also includes "haunches" or protrusions (156) to either side of the release body (114). These protrusions may have any of a number of functions, including providing room for the catch mechanism (111), connecting the interior structures to the outer portion of the catch body (108), or other functions.

In this example, an interior portion (215, FIG. 2G) is separately molded and slipped into the outer housing of the catch body (108). An end view of an interior portion (215) showing this cup shape is shown in FIG. 4B. FIGS. 4I and 4J show the ribbon (118) path over the surfaces of the interior portion (215). For clarity, the outer housing of the catch body (108, FIG. 4A) has been removed from FIGS. 4I and 4J. In FIG. 4I, a surface on the interior portion (215) that is adapted to receive and guide the ribbon (118). The ribbon (118) passes along this surface and is redirected to attach to and move the catch (110). As shown in FIGS. 4G, 4H, and 4I, side tabs (220) are received by the haunches (154) to help secure the interior portion (215) in place within the outer housing of the catch body (108).

FIG. 4J shows the attachment of the ribbon (118) to the underside of the catch (110). In this example, the ribbon (118) is secured using a block (222) and/or washer and screw (218). Other examples of attachments are shown in FIGS. 7A-7F.

FIG. 4K is a front view of the lock (100) with the ribbon (118) passing along a groove (142) in the U bracket (112) and connecting the catch (110) and the release slider (130). FIG. 4L shows one illustrative attachment of the ribbon (118) that includes a block (222) secured by a screw (218). This connection method may be similar to that shown in FIG. 7C. However, any of a variety of ribbon connection methods may be used. FIG. 4L also illustrates differences between the finger posts (e.g., a first finger post 155A and a second finger post 155B). The finger posts may have a variety of different configurations and geometries. In one embodiment the first finger post (155A) has a number of exposed ribs while the second finger post (155B) does not have the ribs.

Figure 5C:
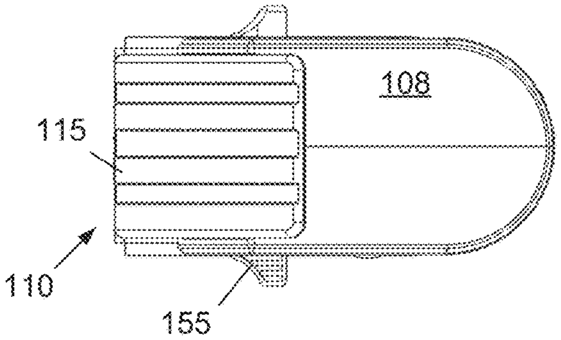
FIGS. 5A-5H show views of an alternative lock design, according to one example of principles described herein.
Figure 5A:
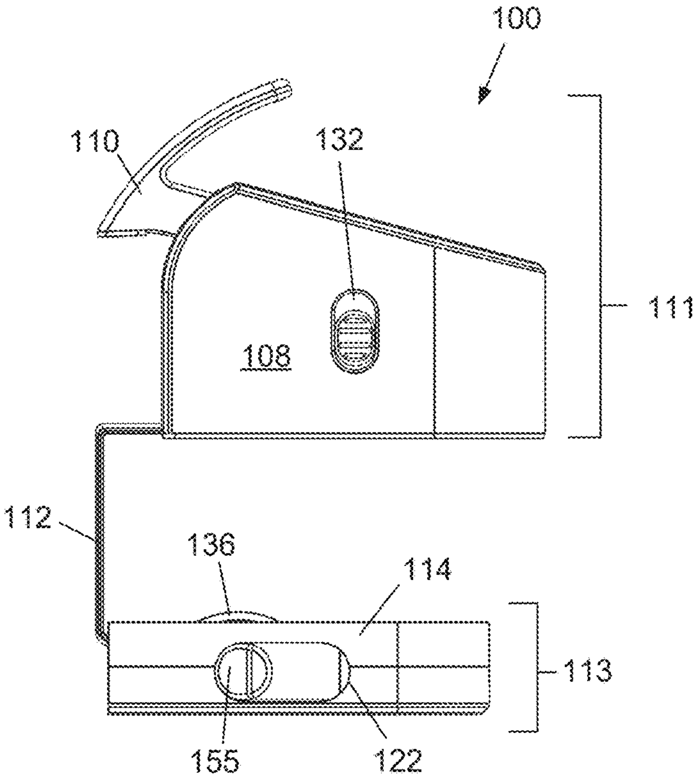
Figure 5B:
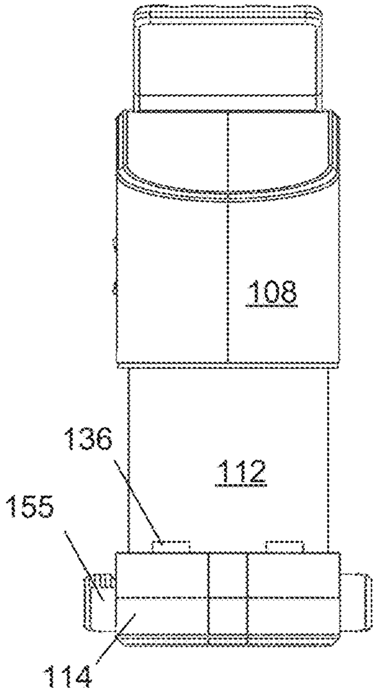
Figure 5D:
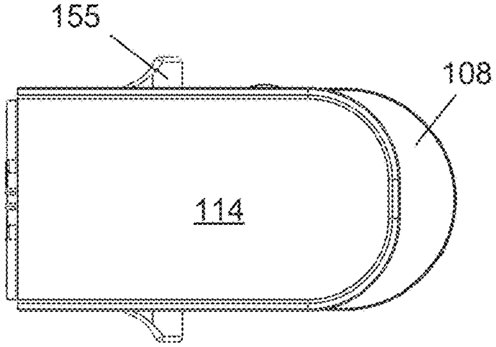
Figure 5E:
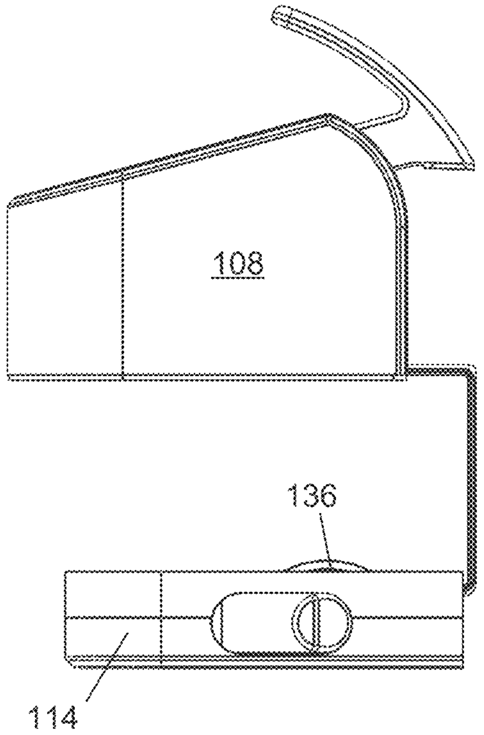
Figure 5F:
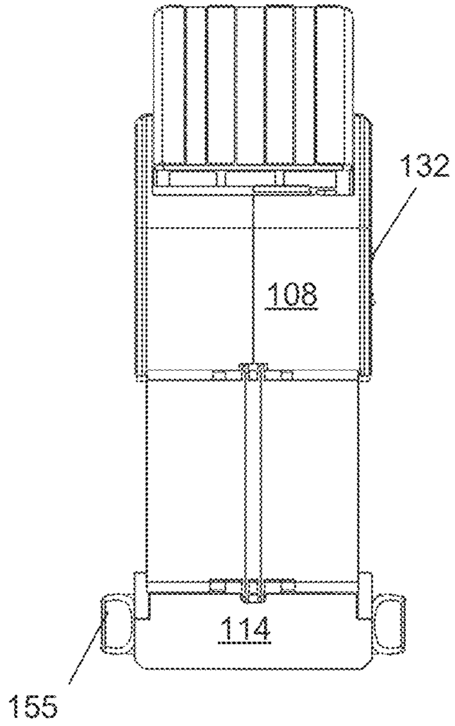
Figure 5G:
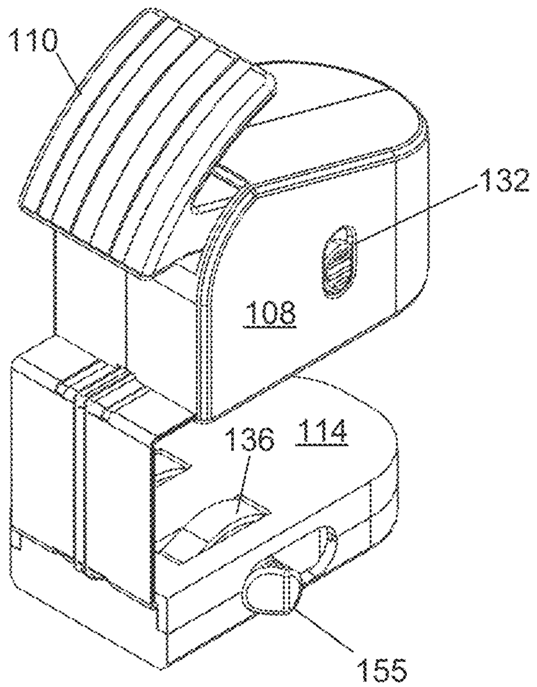
Figure 5H:
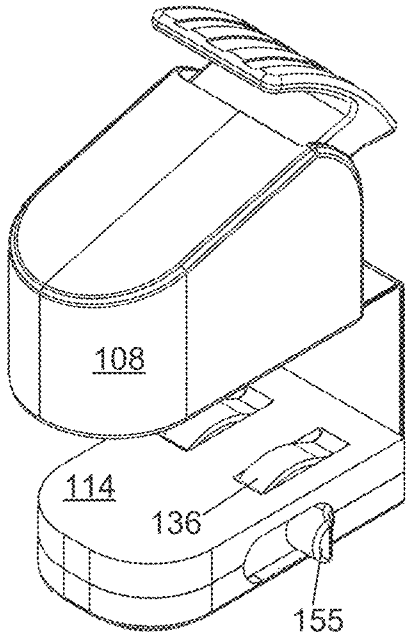

FIGS. 5A-5H show various views of one example of an illustrative instance of a lock (100). FIG. 5A shows a right side view of the lock (100), FIG. 5B shows a rear view. FIG. 5C and FIG. 5D are top and bottom views, respectively. FIG. 5E is a left side view, and FIG. 5F is a front view. FIGS. 5G and 5H are front and rear perspective views, respectively.

These figures show a lock (100) that includes a catch mechanism (111) and a release mechanism (113) that are connected by a U bracket (112). As discussed above, the release mechanism (113) may include finger posts (155) traveling in the access opening (122) of the release body (114). The catch mechanism (111) includes the catch (110) and catch body (108). In this embodiment, the catch ramp (115) includes a number of wide flat surface grooves and ridges. The ridges contact the door and door jamb, while the grooves are slightly recessed. This alters the contact of the catch ramp (115) by changing the surface area of the catch ramp (115) that contacts the door frame/jamb.

This embodiment also includes slightly modified spring ramps (136). In this example, instead of the spring ramps (136) being connected to the release body (114) on both ends, they are attached on only one end. In some embodiments where larger and more repeatable spring force is desired than can be readily produced by spring ramps (136) formed of or comprising plastic, the metal of the U bracket (112) may be bent or stamped into spring shapes that directly or indirectly contact the door. For example, in the embodiment shown in FIGS. 5A-5H, the metal of the U bracket (112) may be bent upward to support the spring ramps (136) (e.g., spring ramps (136) formed of or comprising plastic).

As shown in FIGS. 5A and FIG. 5G, catch lock (132) is placed on the catch body (108). In this embodiment, the manually manipulatable surface of the catch lock (132) is relatively low profile and contains a number of ribs that facilitate the manual engagement and disengagement of the lock with the catch (110). FIG. 5F shows a front view of the lock (100) where the catch lock (132) is barely visible.

Figure 6C:
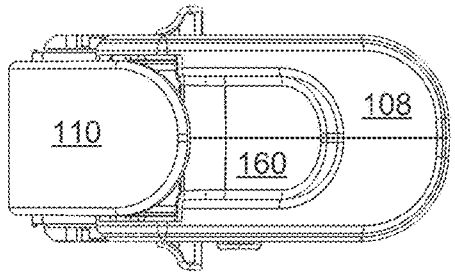
FIGS. 6A-6H show views of an alternative lock design, according to one example of principles described herein.
Figure 6B:
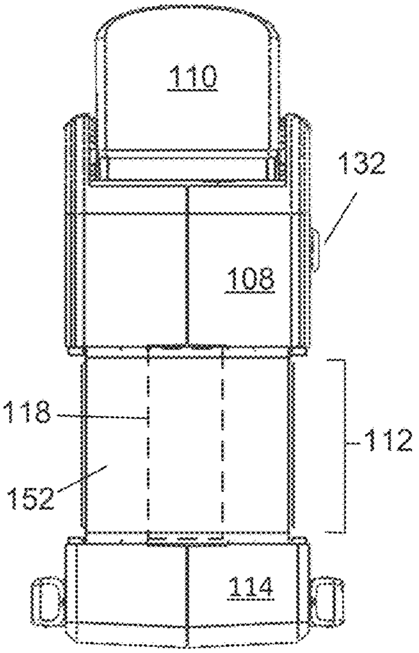
Figure 6A:
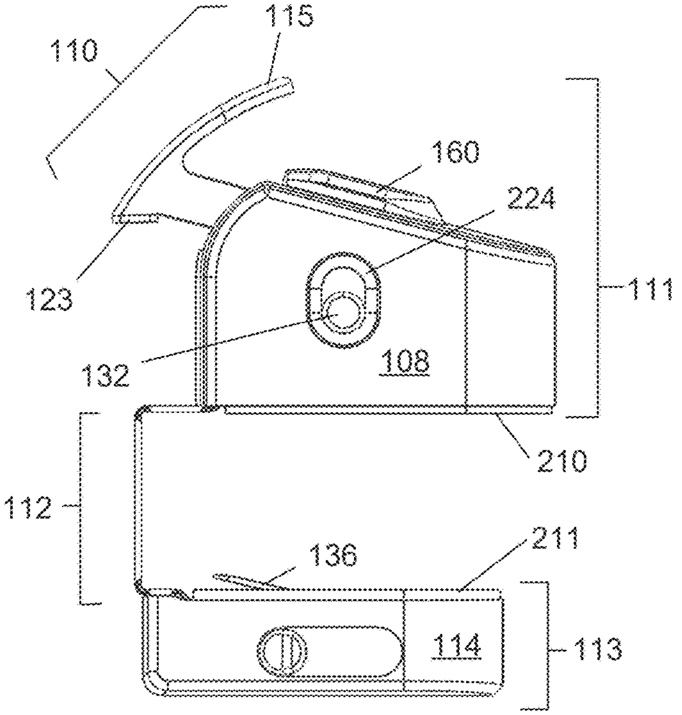
Figure 6D:
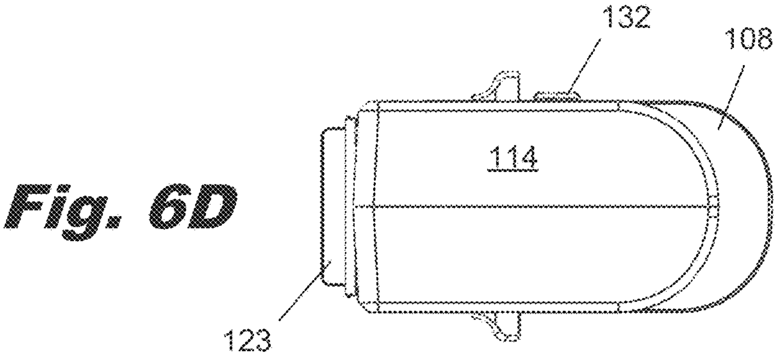
Figure 6E:
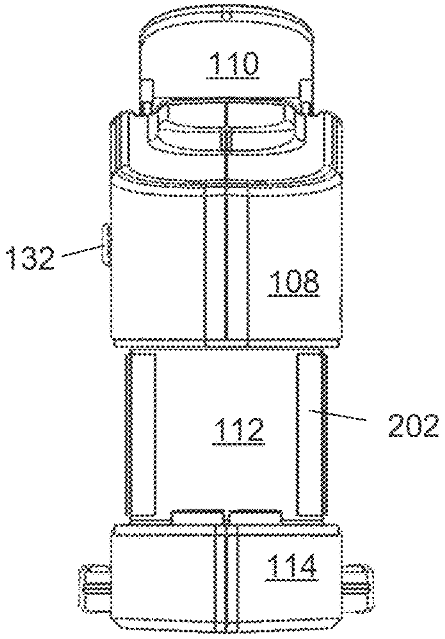
Figure 6F:
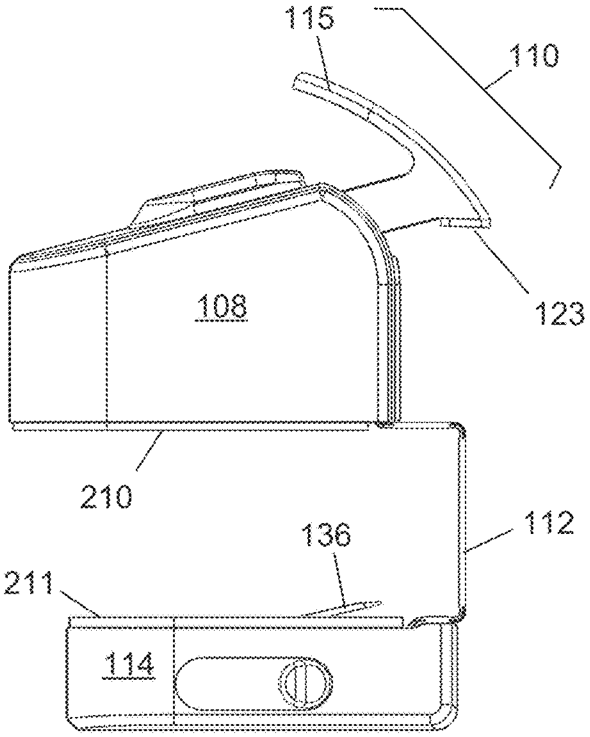
Figure 6G:
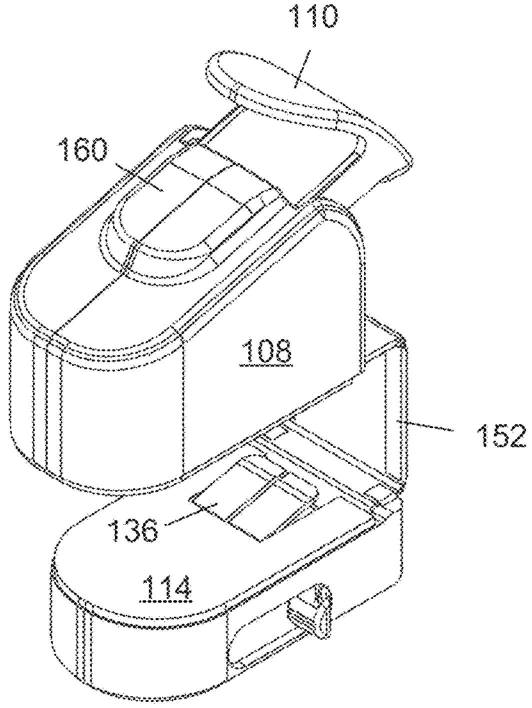
Figure 6H:
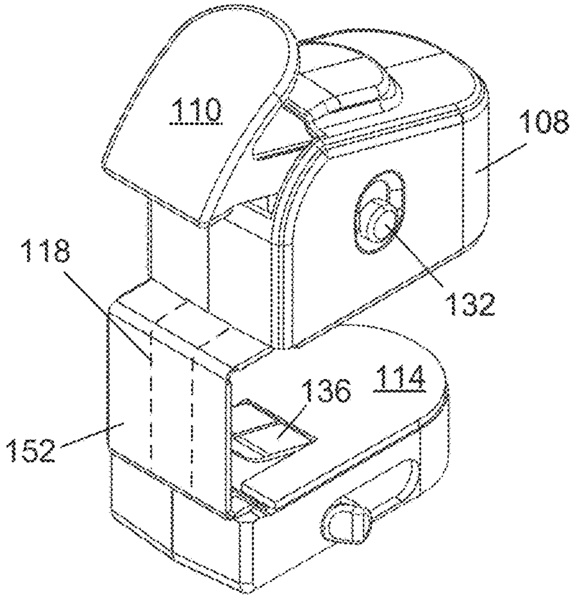

FIGS. 6A-6H show various views of one example of an illustrative instance of a lock (100). FIG. 6A shows a right side view of the lock (100), FIG. 6B shows a front view. FIG. 6C and FIG. 6D are top and bottom views, respectively. FIG. 6E is a rear view, and FIG. 6F is a left side view. FIGS. 6G and 6H are rear and front perspective views, respectively.

These figures show a lock (100) with a catch mechanism (111) connected to a release mechanism (113) by a U bracket (112). In this example, the U bracket includes a sticker (152) that covers a ribbon (118), pointing to a dashed outline in FIGS. 6B and 6H. In some embodiments, this sticker (152) wraps around the back of the U bracket (112). These folded over edges (202) are shown in FIGS. 6E and 6G and may help secure the sticker (152) in place. The U bracket (112) structure may be similar to any of those shown in FIGS. 3C-3F, but with one or more of the stickers (152) wrapping around to the opposite side.

The figures also show that the catch mechanism (111) include the catch body (108) with a catch (110) and a catch lock (132). In this example, the catch lock (132) is a rounded peg without the ridges that facilitate manual engagement of the lock (100). While this makes the catch lock (132) more consistent with the design language of the product, it also makes it harder to move. Consequently it can be desirable for the opening (224) that the catch lock (132) extends through to be contoured downward, thereby allowing more of the rounded peg to be exposed.

The catch body (108) also includes a protrusion (160) on the top side. This protrusion (160) may serve a number of purposes, including providing volume for ribs to align the top walls of the catch body (108) and to reinforce it so that when the catch (110) is engaged and the door is forcefully opened, catch body (108) does not break.

In this embodiment, the catch (110) includes a gripping pad (123) and a ramp (115). In general, a minimum length of the ramp (115) is determined by the amount of extension of the catch (110). When fully extended, the ramp (115) must engage with the door frame and/or the door jamb and force the catch (110) to retract into the catch body (108). In most cases this motion is opposed by internal springs in the catch body (108). The retraction of the catch (110) into the catch body allows the door to shut with the catch (110) riding around the door frame and door jamb then extending behind the door jamb to automatically lock.

Figure 8A:
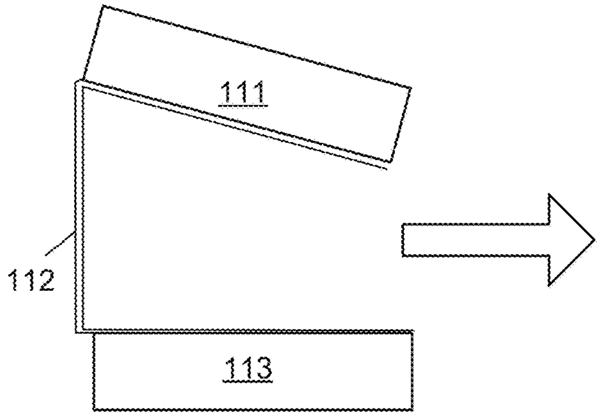
FIGS. 8A-8H show various structures and components for securing a lock to a door, according to one example of principles described herein.
Figure 8B:
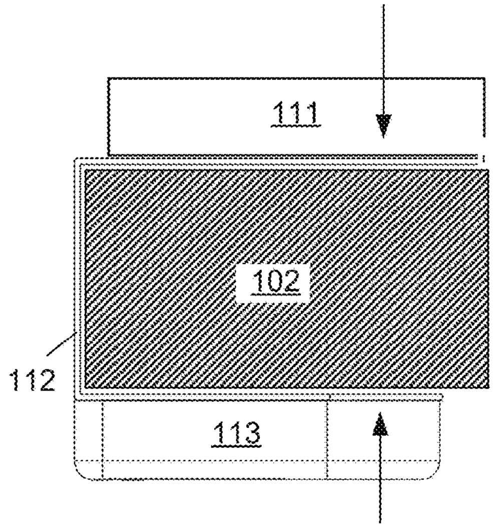

This embodiment shows spring ramps (136) formed in the release body (114). These spring ramps (136) can replace the screws (116, FIG. 1A) shown in FIGS. 1A-1G. For example, the spring ramps (136) can function as a tightening piece to hold the lock (100) firmly in place around the door. As discussed above, these spring ramps (136) may be useful to increase pressure on the door and to allow the lock (100) to adapt to different door thicknesses. However, these types of features may not be necessary. As shown in FIGS. 8A-8B, the spring force of the U bracket (112) may be sufficient to secure the lock in place. One element that may help to secure the door is a catch side pad (210). This catch side pad (210) is secured to the underside of the catch body (108) and may serve a variety of functions. The primary function of a catch side pad (210) may be to grip the door. Consequently the catch side pad (210) should typically be grippy without being adhesive. In some situations, a similar instance of a release side pad (211) may be fastened on the opposite side to the release body (114). The release side pad (211) may serve a slight different function in some embodiments. The release side pad (211) may be more resilient and thicker to apply a continued force on the door. This may become more important in designs where the spring ramps (136) are not used. The release side pad (211) may still be sticky or adherent.

Figure 7A:
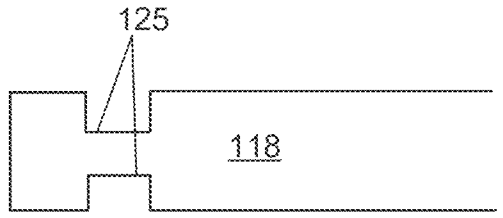
FIGS. 7A-7F show various ribbon connection configurations, according to one example of principles described herein.
Figure 7B:
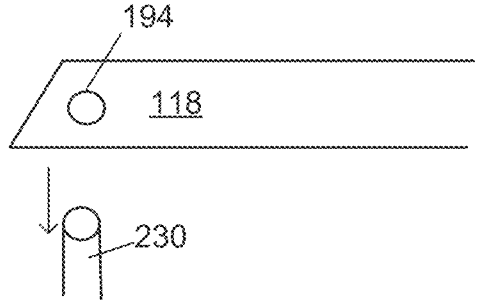
Figure 7C:
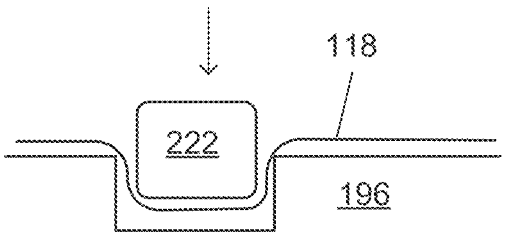
Figure 7D:
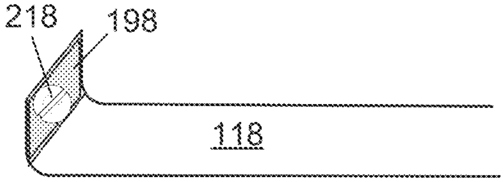
Figure 7E:
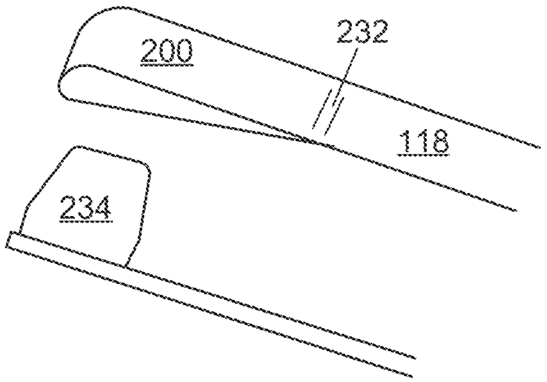
Figure 7F:
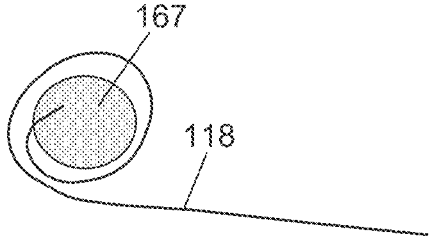

FIGS. 7A-7F show a variety of connection methods for ribbons (118) to connect to other components in the lock (100, FIG. 1A). FIG. 7A shows a ribbon (118) with two notches cutout of either side of an end. The notches can be configured to fit over corresponding features in the housings or sliders. FIG. 7B shows an additional or alternative method of connecting/anchoring a ribbon (118) that includes a hole or aperture (194) in the ribbon (118) that fits over a post (230) or other features. In other embodiments, as shown in FIG. 7C, the ribbon (118) may be sandwiched between a block (222) and base (196). The block (222) may be secured in place in a variety of ways and any number of features to increase its grip on the ribbon (118). For example, the block (222) may have surface features such as textures, grooves, ridges, etc. that increase the friction and holding power of the connection with the ribbon (118). In some examples, the base (196) may have corresponding features to further increase the holding power of the connection. In the example shown in FIG. 7C the base (196) includes a cavity that is configured to accept the block (222) and ribbon (118). FIG. 7D shows another method of attaching the ribbon (118). In this embodiment, the ribbon (118) is secured using a screw (218) and washer (198). The screw (218) passes through the ribbon (118) and into a base (not shown), while the washer (198) is used to pinch the ribbon (118) between it and the base (196). FIG. 7E shows a ribbon (118) with a loop (200) that is formed by folding the ribbon (118) over on itself and forming a heat sealing the ribbon (118) to itself. This heat seal (232) secures the two parts of the ribbon (118) together and forms a loop (200). The loop (200) can be placed over a tab (234). There are various ways of securing the loop (200) over the tab (117), including shaping the tab (117) so that it will retain the loop (200). FIG. 7F shows an alternative method of securing the ribbon (118) which includes rolling the retract ribbon (188) around a rod (167). The end of the ribbon (118) may pass through a slot in the rod (167) or be secured to the rod (167). Alternatively the rod (167) and ribbon (118) may have sufficient friction such that a more mechanical connection is not required. Although there are only a few connections explicitly shown, there is a wide range of connections that could be utilized to implement the principles described. For example, the cable or ribbon can be attached to the catch (110) by crimping, soldering, welding, using adhesive, using screws or bolts, using tie-wraps or zip ties, knotting or can be connected in some other way.

Although ribbons are shown and described in many of the embodiments shown herein, cables, cords, strings, tubes, and other elements may also be used to communicate mechanically between the two components of the lock. Ribbons may have a number of advantages, including being thin so they will fit through the gap between the door and the door frame, distributing force across their width, and being relatively strong because of their width. Further, because of their geometry, ribbons have a preferred buckling/bending direction. For example, ribbons will bend along axes that are parallel to their width. Ribbons do not bend along axes that are perpendicular to their wide dimension.

Cables and cords with more symmetric cross sections (e.g. round, oval, or square cross sections) may have a number of advantages, including more straight forward connection mechanisms. For example cords, such as monofilament lines, have well established knots and connection mechanisms within the fishing industry that can be leveraged. On the other hand, cords tend to buckle in a more random fashion and may become tangled or caught inside the various channels and bodies of the lock.

Depending on the material that is used for the ribbon, it may be beneficial to take into account the material properties of the ribbon. For example, if the ribbon is prone to tearing if it is damaged or cut, then certain connection mechanisms may be better than others. For example, if the ribbon is prone to failure due to damage, sandwiching it between a block and base as shown in FIG. 7C or rolling it around a shaft as shown in FIG. 7F may be beneficial.

Figure 8C:
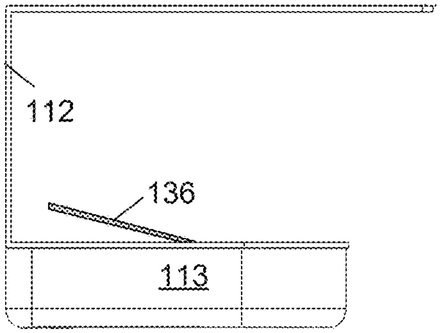
Figure 8D:
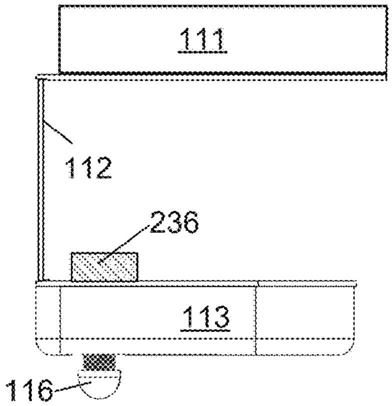
Figure 8E:
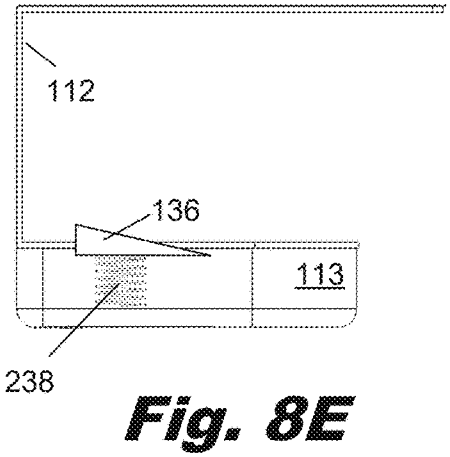
Figure 8F:
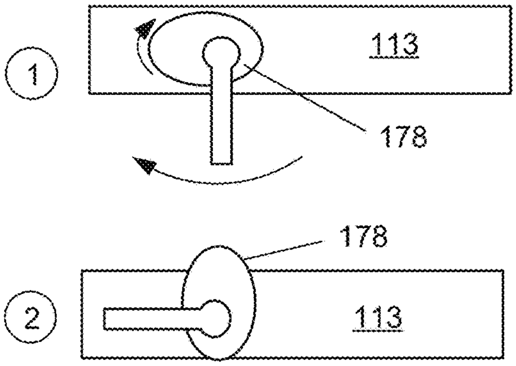
Figure 8G:
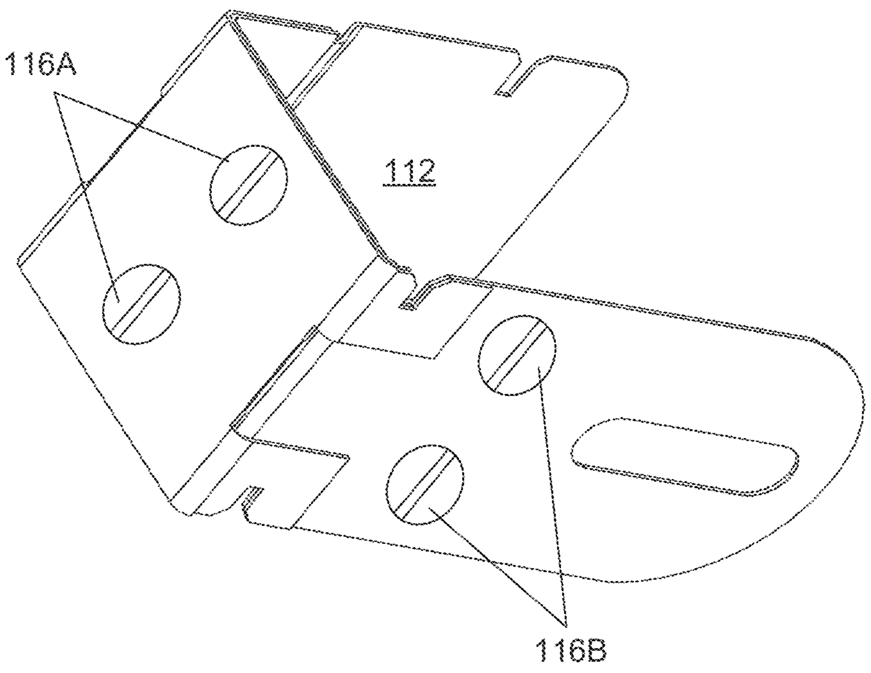
Figure 8H:
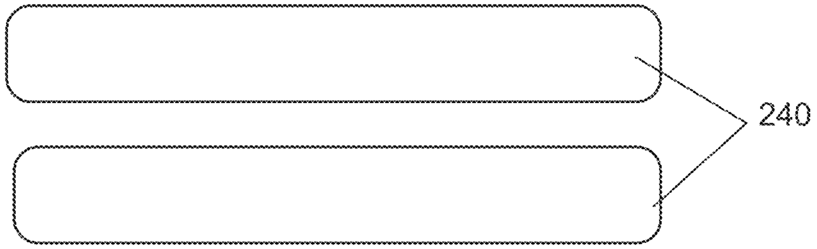

FIGS. 8A-8F show various techniques for securing the lock around the edge of the door. As discussed above, the lock would ideally be easy to install over the door, but remain securely in place on the door once installed. FIG. 8A shows a U bracket (112) that is formed from a resilient material such as steel or stainless steel. The U bracket (112) is bent inward so that when it is spread apart to go over the door (102), it exerts a clamping force that secures it over the door as shown in FIG. 8B. FIG. 8C shows an illustrative lock with a U bracket (112) and a release mechanism (113). For purposes of illustration the catch mechanism is not shown. The release mechanism (113) in this example includes several springs ramps (136) extending upward. When the U bracket (112) is forced over the door the springs are compressed and exert a force on the door that tightens the lock on the door. The springs in this example are spring ramps (136) shaped to facilitate the insertion of the edge of the door into the U bracket (112). FIG. 8D shows one or more screws (116) that push a block (236) into the interior of the U bracket (112) when tightened. This can be used to tighten the U bracket (112) on the door. Other embodiments may use coil springs (238) such as those shown in FIG. 8E. A cam mechanism (178) may be used as shown in FIG. 8F. In the upper portion (labeled "1") of FIG. 8F, the cam mechanism (178) in the release mechanism (113) is in the unlocked position with arrows showing that a lever can be rotated to engage the cam. In the lower portion (labeled "2") the cam mechanism (178) is engaged and would tighten the lock on the door. If a user is willing to damage or alter the door a variety of alternative methods for attaching the lock to the door are available. These include the use of screws (116A, 116B) as shown in FIG. 8G and the use of adhesive strips or tape (240) as shown in FIG. 8H.

The mechanisms shown in FIGS. 8A-8F are only illustrative examples. There are a variety of ways that the lock could be removably secured to the door. In FIGS. 8C through 8F the mechanisms protrude from the release mechanism (113) to exert force of the door. However, there may be a variety of other approaches that could be used. For example, the mechanisms may extend from the catch mechanism (111) or from both the release or catch mechanisms. Additionally or alternatively, the entire release mechanism may be internally spring loaded against the bracket so that it extends into the gap where the door edge will reside. A variety of different thicknesses and types of foams and adherent pads may also be used or supplied with the lock to increase the security of the lock on the door edge and/or accommodate different thicknesses of doors. In other examples, the bracket itself may be adjustable to accommodate different thicknesses of doors.

Turning to FIGS. 9A-9D, the lock (100) may have a number of features, including a catch lock (132). As shown above, the catch lock (132) can secure the catch (110) in a retracted position, thereby disabling the lock (100) and allowing the door to be easily opened and closed using the regular door handle. In some situations, it may be desirable to lock the catch in its extended position. This helps to ensure that the catch remains extended and engaged with the door jamb, regardless of the efforts of children to rattle or force the door open. However, before the lock can be opened by an adult, the catch lock should be disengaged so that the catch can be retracted.

Figure 9A:
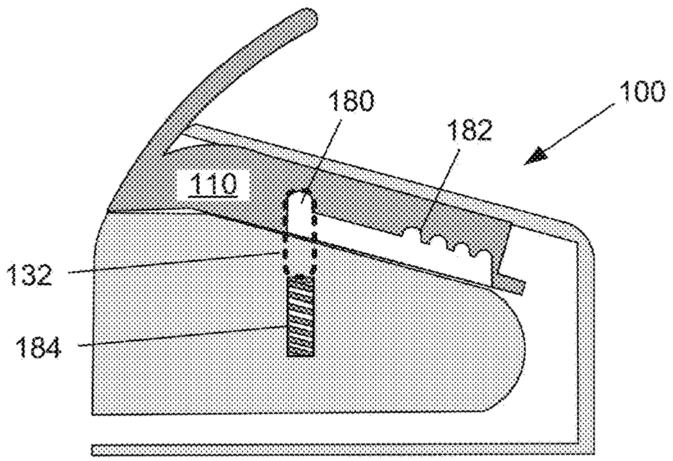
FIGS. 9A-9E show various structures and techniques for locking and releasing a catch, according to one example of principles described herein.
Figure 9B:
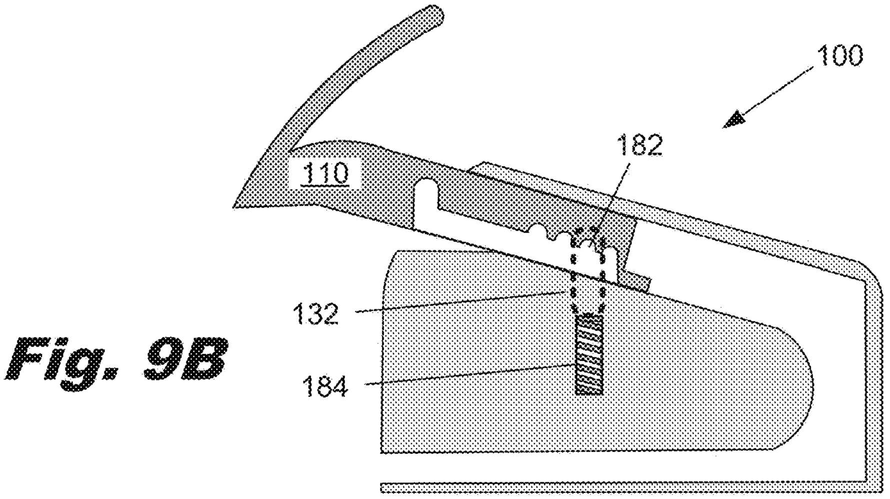

FIGS. 9A-9D show illustrative structures and principles for locking the catch (110). FIG. 9A shows an illustrative instance of a lock (100) that includes a catch lock (132), a spring (184) and a catch (110) that includes a number of features (e.g., an indent (180) and/or an extended indent (182)) that the catch lock (132) can engage with to lock the catch (110) in various positions. In FIG. 9A, the catch (110) is locked in a retracted position in which the catch lock (132) engages with the retracted indent (180). FIG. 9B shows the same mechanism with the catch (110) extended and the catch lock (132) engaging with one of the extended indents (182). In this example there are a number of extended indents (182) that can be used to lock the catch (110) in different extended positions. The extended indent (182) that is used may depend on a number of factors including the distance from the lock (100) to the door frame and/or door jamb. Although a spring (184) is shown in a position that it urges the catch lock (132) into the indent (180) or extended indents (182), a variety of other configurations could be used. In some designs, the catch lock (132) may have a friction or interference fit with the indent (180) and/or extended indents (182). Thus, the catch lock (132) would need to overcome the friction or interference to both lock and unlock.

Figure 9C:
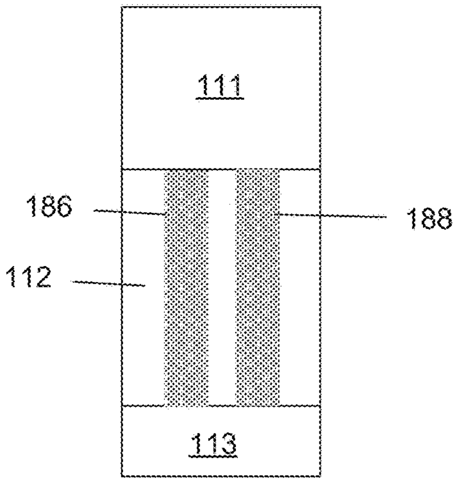
Figure 9D:
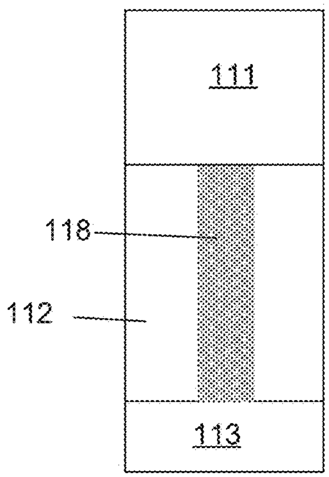
Figure 9E:
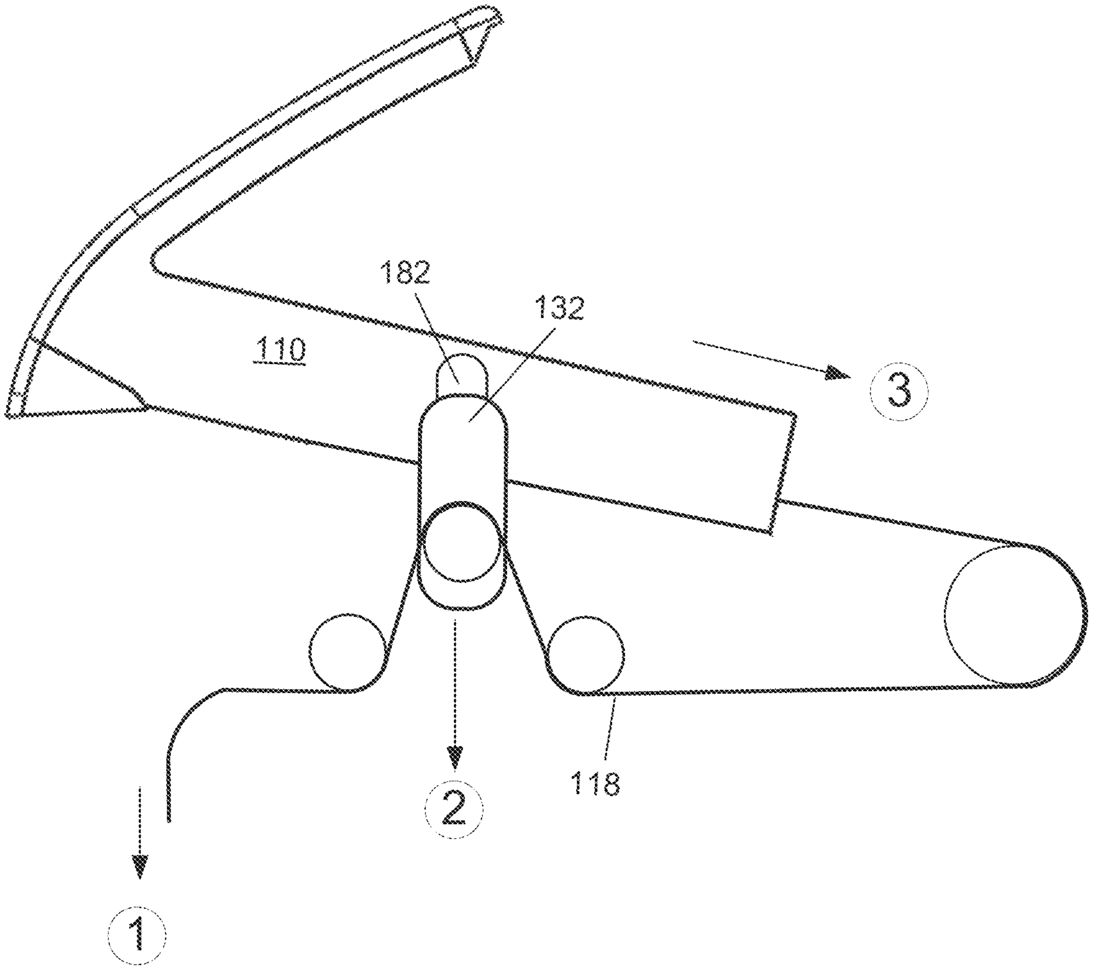

In order to move the catch (110) to a different position, the catch lock (132) should first be disengaged. If the user is on the catch side of the door this may be accomplished by directly manipulating the catch lock (132). However, on the release side of the door, disengaging the catch may be indirectly performed using the communication connection. In FIG. 9C, the U bracket (112) is illustrated connecting the release mechanism (113) and the catch mechanism (111). There are two ribbons (e.g., a release ribbon (186) and a retract ribbon (188)) shown passing from the release mechanism (113), over or through the U bracket to the catch mechanism (111). The release ribbon (186) is operably connected to the catch lock (132) and can be used to release it. The retract ribbon (188) can then be used to retract the catch (110) if desired. FIG. 9D shows the U bracket (112) connecting the release mechanism (113) and the catch mechanism (111). There is one ribbon (118) passing from the release mechanism (113), over or through the U bracket (112) to the catch mechanism (111). In this example, the single instance of the ribbon (118) may perform both functions. One embodiment of this design is shown in FIG. 9E. In this design, the path of the ribbon (118) passes over a roller or other feature of the catch lock (132) such that when the ribbon (118) is tensioned (see arrow labeled "1"), the catch lock (132) is pulled downward to disengage the catch lock (132) from the extended indent (182) (see arrow labeled "2"). The catch (110) can then be retracted (see arrow labeled "3") by the ribbon force.

Figure 10A:
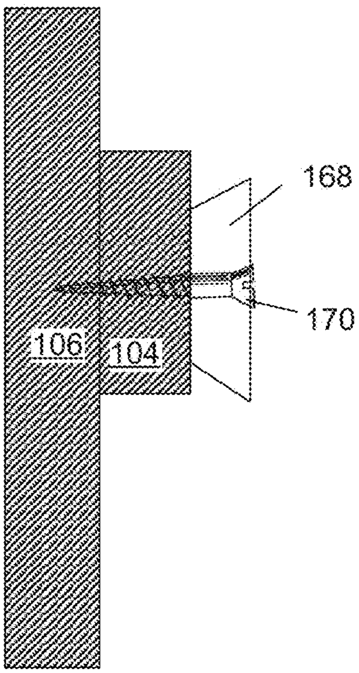
FIGS. 10A-10F show diagrams of various locking mechanisms, according to one example of principles described herein.
Figure 10B:
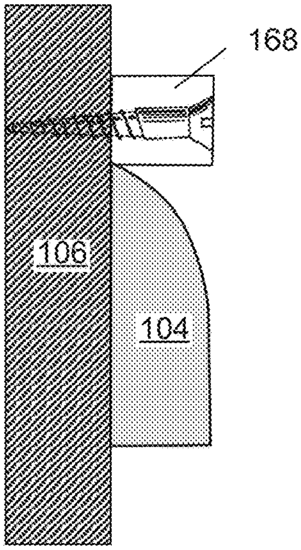

FIGS. 10A-10F show a number of alternative designs. The previous illustrative designs show mechanisms that engage with the door jamb of a door using a sliding catch mechanism. However, these are only examples. A variety of other configurations could be used. FIGS. 10A-10F show a number of additional or alternative designs. For example, FIG. 10A shows a bracket (168) that can be screwed onto the door frame (106) or door jamb (104). This bracket (168) may have a variety of geometries that can be selected to complement or engage with a range of different lock designs. In this example, the bracket (168) is dovetail shaped and secured by one or more screws (170). The dovetail bracket may have a number of advantages including creating a secure connection with a customized catch mechanism. However, the shape may be different. For example, if the catch has difficulty retracting from a dovetail bracket that has an inwardly sloping surface, the bracket may have a different geometry and/or texture. FIG. 10B shows an alternative instance of a bracket (168) that has flat surfaces and is secured by a screw or other appropriate attachment method, such as nails, staples, adhesive, or other technique. In this case, the bracket is secured directly to the door frame (106) above the door jamb (104). The door jamb (104) in this example has a curved surface that may be difficult for the catch to engage. The bracket (168) may be configured to present an alternative surface for the catch to engage with. The attachment of a bracket may be useful for door installations that do not have door jambs of the type shown in the figures. For example, in some countries the standard door installation simply routes out a portion of the door frame to mount the door in. Consequently the door frame becomes both the frame and the door jamb. Thus, there is not an edge for the catch to engage. In this situation mounting a bracket to the door frame may be useful.

Figure 10C:
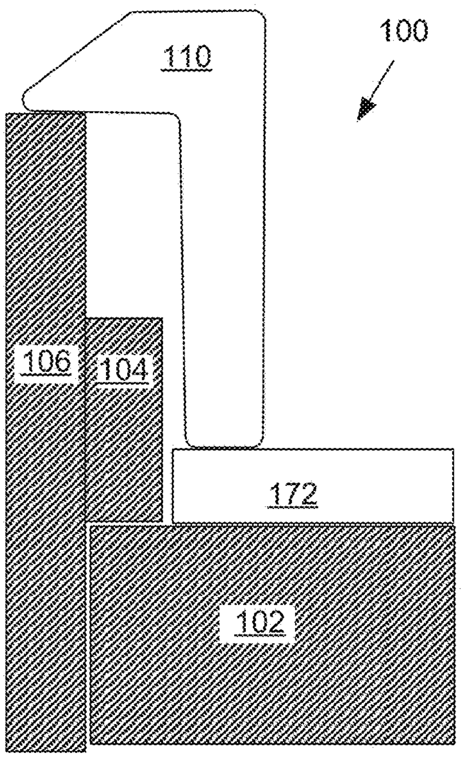

FIG. 10C shows a lock (100) that engages with the door frame (106) instead of the door jamb (104). In this example, the lock (100) includes a base (172) and an elongated catch (110). The catch (110) reaches over the door jamb (104) to engage the door frame (106). This may avoid a number of difficulties, including door jambs that have surface profiles that are difficult to engage and have limited thickness. In general, the door frame (106) is larger, more robust, and flatter than the door jamb (104). However, it is farther from the surface of the door and consequently requires a larger catch (110).

Figure 10D:
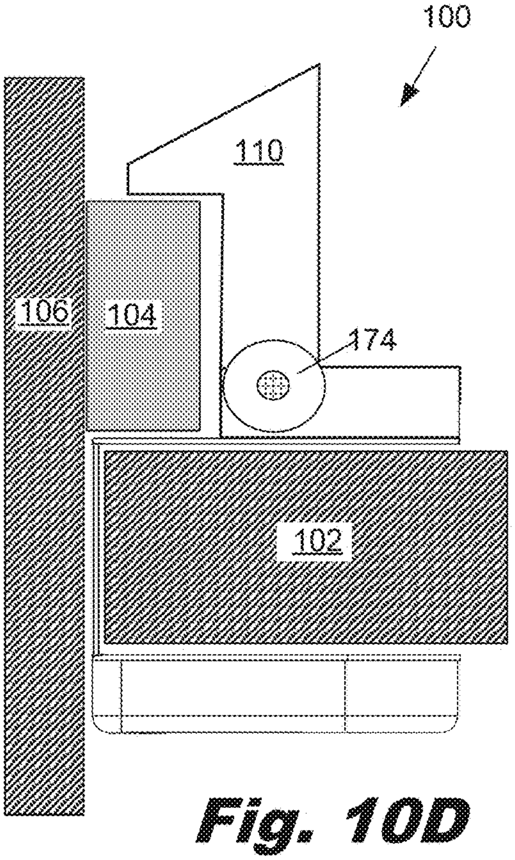

FIG. 10D shows an alternative instance of a lock (100) that includes a rotating catch (110) that engages with the door jamb (104). This lock (100) may have a number of advantages, including the more direct transfer of forces when a person attempts to open the door (102). The pivot (174) is close to the door jamb (104) and the tension force in the catch (110) when the door (102) is being forced open is transferred through the pivot (174) to the door (102) with a minimum amount of torque/lever forces that the lock (100) has to withstand. Provided that the lock (100) is securely fastened to the door, this lock (100) is a robust design from a mechanical perspective.

Figure 10E:
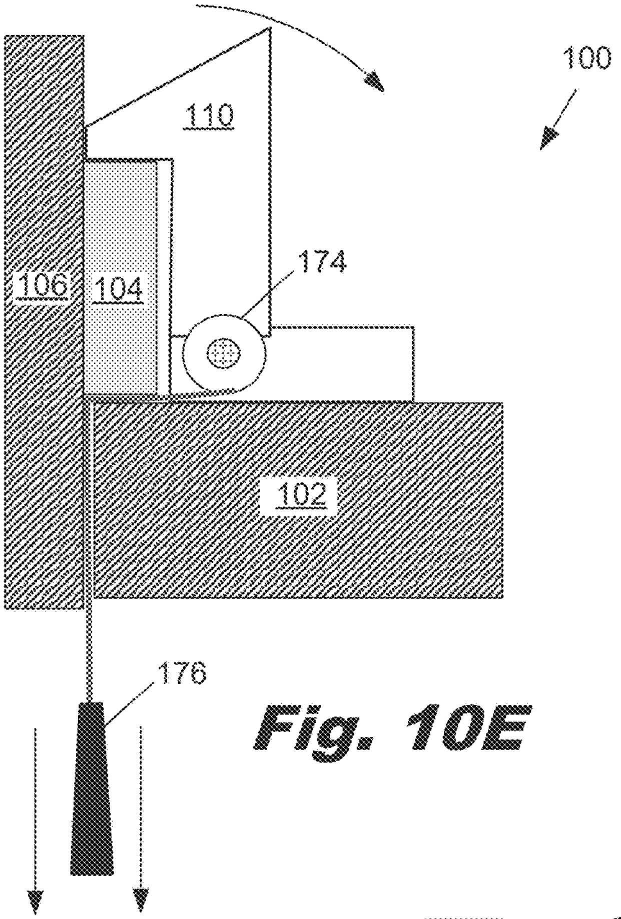

FIG. 10E shows a lock (100) that is similar to the mechanism shown in FIG. 10D. However, in this example, the catch (110) can be released by a release pull (176). The release pull (176) may take a variety of different configurations, including a wide flat ribbon that includes a handle on its end to facilitate a user grasping and pulling it to release the catch (110). The arrow demonstrates how the catch (110) would open once the release pull (176) has been pulled.

Figure 10F:
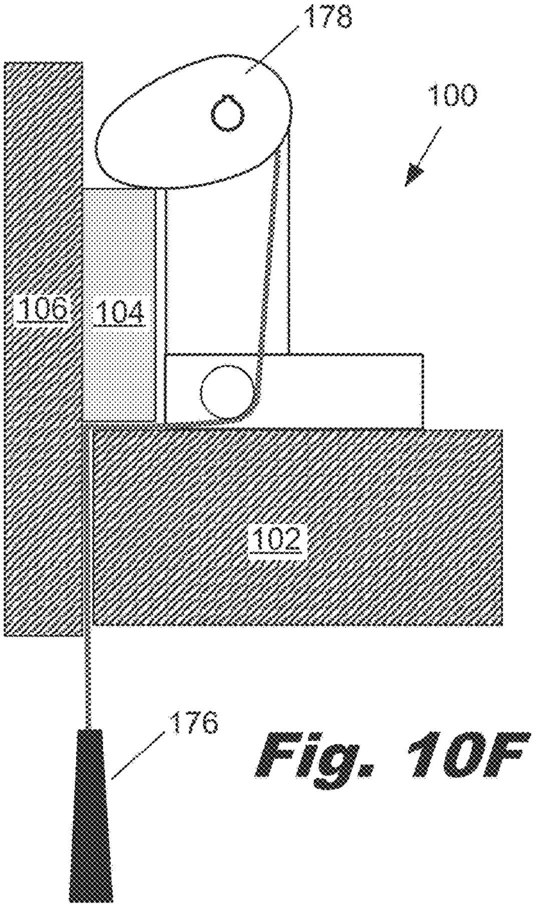

FIG. 10F shows a different instance of a lock (100) that includes a cam mechanism (178) to engage the door jamb (104). To lock the door (102) shut, the cam mechanism (178) rotates to engage the door jamb (104). The advantage of the cam mechanism (178) is that it can continue to rotate to tighten the door (102) in the closed position. This allows the lock (100) to secure the door (102) in a tightly closed position and prevents the door (102) from rattling. In some embodiments, the cam mechanism (178) may include a torsion spring and ratchet mechanism that allow it to automatically tighten as the door is closed. In some embodiments, the release pull (176) does not actually rotate the cam mechanism (178). Instead it just disengages the ratchet or cam mechanism (178) and allows the cam mechanism (178) to rotate out of the way when the door is opened.

Figure 11:
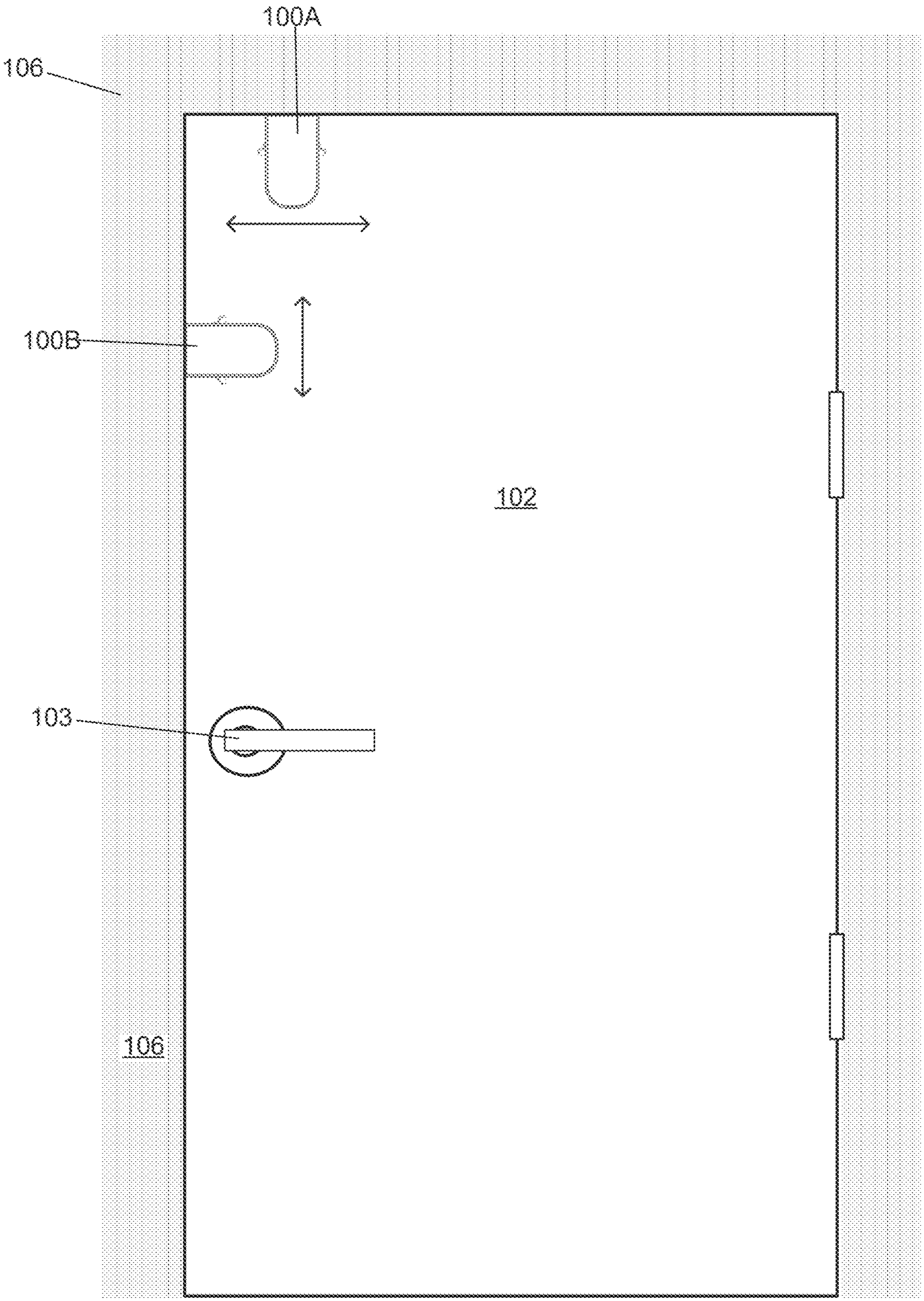
FIG. 11 shows a door and various lock positions around the door edge, according to one example of principles described herein.

FIG. 11 shows an illustrative instance of a door (102) with a door frame (106) and locks (100A, 100B) that are attached to different positions of the door (102). In this example, the lock (100B) can be inserted around the door (102) on the upper side of the door handle (103) away from the reach of small children, preventing them from opening the door (102). In another example, the lock (100A) can also be attached to the top section of the door. The position of the lock (100) on a door (102) will depend on the user's preference as the device is designed to have a firm grip around any door surface.

Figure 12:
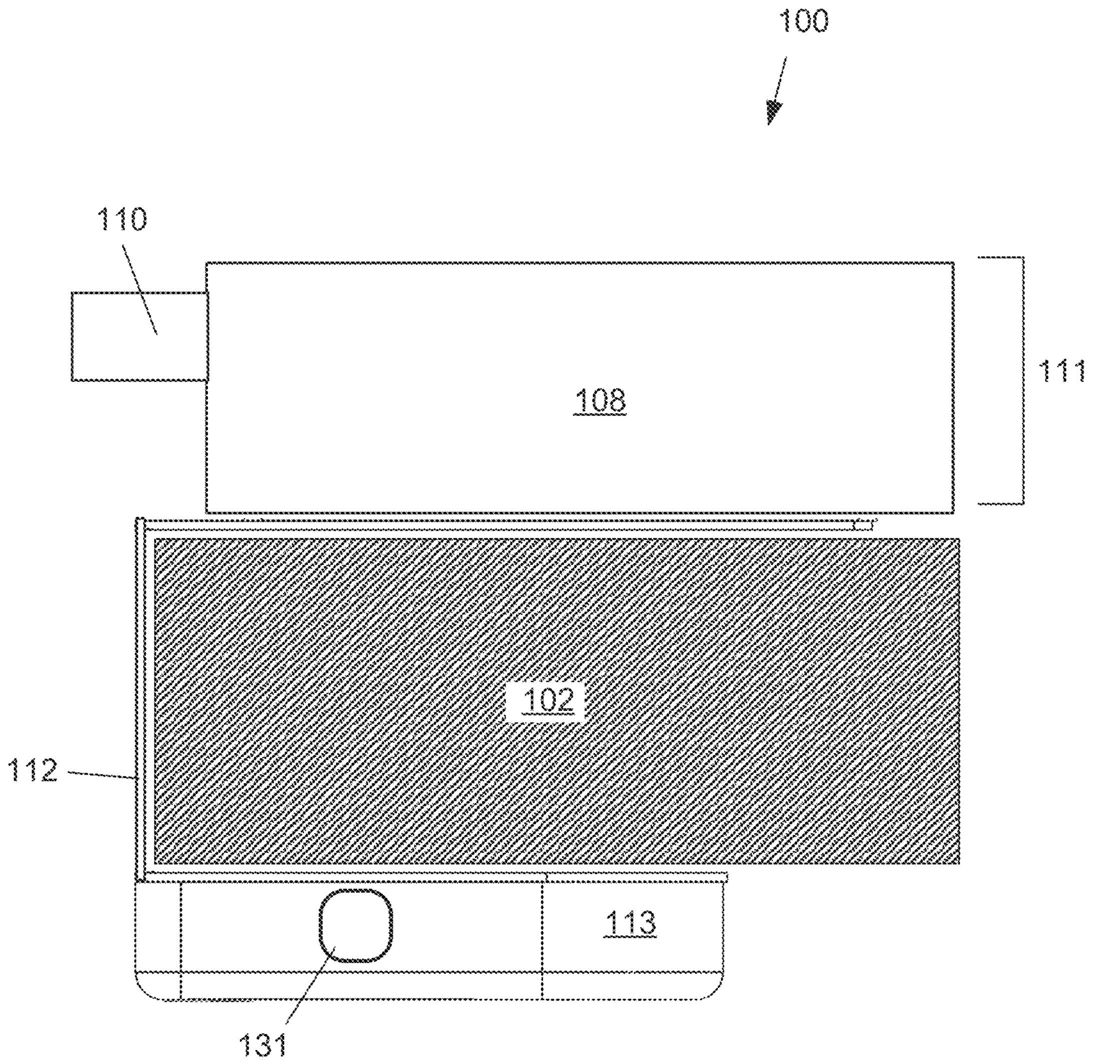
FIG. 12 shows an alternative lock mechanism, according to one example of principles described herein.

There are a variety of different configurations and mechanisms that could be used for locks. For example, FIG. 12 shows a lock (100) that includes an electrically actuated catch (110). The catch body (108) may include a variety of actuators, including solenoids, electric motors, gear boxes, linear actuators, rotary actuators, electromagnetic actuators or other types of mechanisms configured to move or release the catch (110). On the opposite side of the door (102), the release mechanisms (113) may include electronics, batteries, a release trigger, lights, cameras, or any other desired electrical or mechanical device. For example, the release trigger could include a fingerprint reader or other biometric device, a button, a camera with facial or other recognition, a key pad, a combination lock, a scanner, a barcode/barcode reader, an RFID reader, a touch screen, a variety of sensors, or combinations thereof. In this example, a release button (131) is illustrated on one side of the release mechanism (113). However, this is merely an example. The button or buttons could be on any other appropriate surface and configured in a variety of ways. The U bracket (112) may include mechanical and/or electrical components. For example, the U bracket (112) may include mechanical elements designed to secure the device to the door (102) and electrical components to communicate between the release mechanism (113) and the catch mechanism (111). In one embodiment, the U bracket (112) includes one or more conductors and a metal frame to protect the conductors and to mechanically connect the two parts of the lock (100). For example, the conductors could be wires, traces of flexible circuit, a ribbon, cable, or other conductors.

The description above is only illustrative. A variety of other configurations could be used. For example, in some embodiments, the U bracket may not be included. Instead, the components on opposite sides of the door may communicate through various electronic means, including but not limited to Bluetooth, Wi-Fi, RFID, or other wireless protocol. In other embodiments the magnetic or electromagnetic communication may be used to signal between the components on either side of the door. Additionally, mechanical support provided by the U bracket may not be necessary. For example, the catch mechanism may be screwed or otherwise secured to the door and the release mechanism may be simply adhered to the door, the door frame, the wall or other location. In some implementations, the release mechanism may be virtual, such as an app run on a mobile or other device or an RFID tag that can be read through the door by the catch mechanism.

Additionally or alternatively, the lock (100) may have pneumatic or magnet components. For example, the communication connection between the release and the catch may be a mechanical structure in the form of a small tube of pressurized liquid or gas that acts on a piston to retract the catch. There may also be magnetic catches and communication with the lock.

FIGS. 13A-13E show various diagrams that describe interaction between a catch (110, FIG. 1A) and the door frame (106) and the door jamb (104). FIGS. 13A-13D are cross sectional diagrams of door frames (106) and door jambs (e.g., a first door jamb (104A), a second door jamb (104B), a third door jamb (104C), a fourth door jamb (104D)). In many door installations, the door jambs (104) are pieces of wooden or other trim that are typically nailed or stapled to the door frame in an appropriate location to stop the door travel when the door is shut and latched. In general, the door contact surface (162) of the door jambs (104) is flat and perpendicular to the door frame (106). This allows the door jambs (104) to contact the flat surface of the door when it closes, thereby preventing further motion of the door.

Figure 13A:
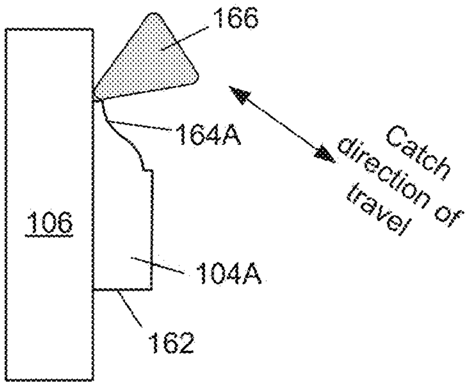
FIGS. 13A-13E show various diagrams of lock engagement with door frames and door jambs, according to one example of principles described herein.
Figure 13B:
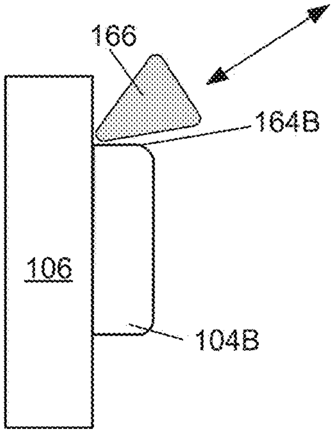
Figure 13C:
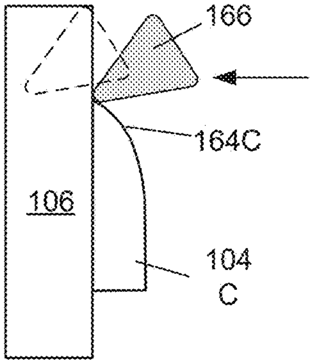
Figure 13D:
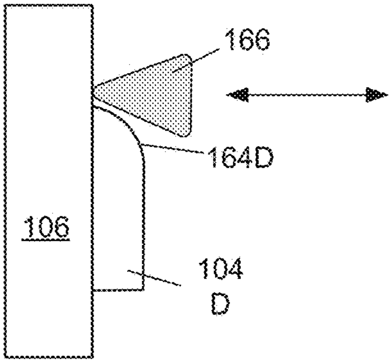

However, the other side (e.g., a first contact surface (164A), a second contact surface (164B), a third contact surface (164C), a fourth contact surface (164D)) of the door jambs (104) can have more varied configurations. For simplicity, the other side or contact surface (164) of the door jamb (104) is called the "catch contact surface" because this is the surface that the catch (110, FIG. 1A) will typically engage. In these diagrams, the door jambs (104) have different cross-sectional profiles that range from fluted edge (see e.g., first door jamb (104A)), a rectangular edge (see e.g., second door jamb (104B)) and various rounded profiles (see e.g., third door jamb (104C) and/or fourth door jamb (104D)). The profile of the catch contact surface (164) clearly can make secure contact between the catch tip (166) and the door jamb (104) easier or more difficult. In general, catch contact surfaces (164) that are larger and perpendicular to the door frame (106) are easier to make secure connections with. For example, in FIG. 13B, the catch contact surface (e.g., a second contact surface (164B)) is large, flat and perpendicular to the door frame, making it easier for the catch tip (166) to engage. However, the catch contact surface (e.g., the first contact surface (164A)) is a much narrower flat surface that transitions into a curved, sloping surface that can be hard for the catch tip (166) to grip. Other catch contact surfaces (e.g., third contact surface (164C) and/or fourth contact surface (164D)) have no flat surfaces at all, but have rounded profiles. Consequently, in some illustrative embodiments, the lock (100, FIG. 1A) is configured to push the catch tip (166) into the door frame (106) with some amount of normal force to ensure that a secure engagement between the catch tip (166) and the door jamb (104) occurs. For spring loaded catches, this can be accomplished by having the catch be forced toward the door frame by the spring and have the travel of the catch be greater than the distance to the door frame. This is illustrated in FIG. 13C by the dashed profile of the contact tip which is in the fully extended position. In the position with the solid outline the spring force is exerted perpendicularly to the door frame as shown by the arrow.

Figure 13E:
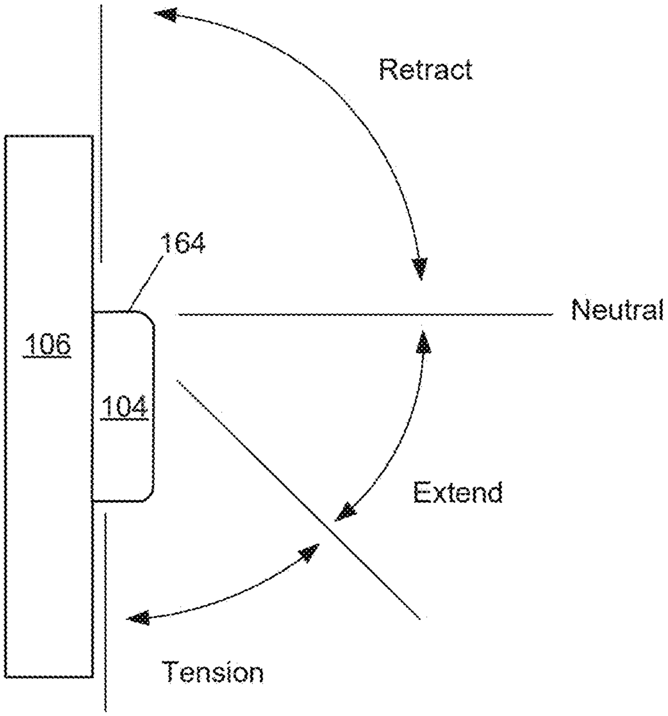

The angle of engagement of the catch with the door jamb can also influence the performance of the lock (100). As shown in FIG. 13E, there are a wide range of angles that the catch (110, FIG. 1A) can engage the door frame (106) and door jamb (104). Each of the different angles have advantages and disadvantages. Examples of locks (100, FIG. 1A) with various engagement angles are shown in previous drawings. For example, the lock (100) in FIGS. 9A and 9B engages with the door jamb at an angle that tends to extend the catch when someone attempts to open the door. The lock in FIG. 12 engages the door jamb at a 90 degree angle and attempting to force the door open while the catch is engaged has a generally neutral effect whether the catch slides in or out. Many of the illustrative locks (see e.g. FIGS. 1A-1G, FIGS. 2A-21, FIGS. 4A-4J) described herein are operating in the "extend" arc, where the door opening force tends to cause the catch to extend farther out of the catch body. This may cause the lock to stay engaged with the contact surface when force is applied to the door. The lock in FIG. 10E has a swinging catch (110, FIG. 10E) with a pivot (174, FIG. 10E) that is connected to the release pull (176), which travels below the catch contact surface (164, FIG. 13). In this situation, the catch (110, FIG. 10E) is placed in tension by someone attempting to force the door open.

FIG. 13E shows a door frame (106) and a door jamb (104) with various angles of engagement for the catch (110, FIG. 1A) laid out in a 180 degree half circle around the contact surface. These angles are divided into various arcs. Some of the implications of designs that engage at various angles with the contact surface will be discussed. For example, for catches that move/slide at angles that are in the "retract" arc, the force of the door opening tends to retract the catch and disengage it. Thus, the mechanism that is moving the catch tends to also have to resist the forces applied by moving the door. Consequently, it can be desirable for designs that engage with the catch contact surface (164) by moving at angles in the retract arc to have a locking mechanism that prevents the catch from retracting. This locking mechanism transfers the forces from the door being forced open to the catch body and the door rather than through other actuation mechanisms in the lock. To open the door, the users should first disengage the internal lock, then retract the catch. Examples of locks that include internal locks are given in FIGS. 9A-9D. Locks with internal locks such as the slide locks shown in these figures may be useful in a wide range of locks, but may be particularly useful for locks that engage along vectors that are in the retract arc.

The majority of conventional door locks have contact angles with the door frame that are along the neutral axis (at 90 degrees to the door frame). For example, conventional door knob mechanisms slide perpendicularly to the door frame. As discussed above, many of the illustrative designs herein operate in the "extend" arc. This provides the benefit of more secure interaction with the door jamb, while shallow angle extension angles used generally allow for sliding retraction when the lock is opened. For locks operating in the "tension" arc, sliding retraction mechanisms will not typically be appropriate because the motion of the slide does not readily disengage the contact tip from the door jamb. However a variety of other mechanisms can be used, such as rotating or swinging mechanisms.

The examples given above are merely illustrative of principles described. There are a wide range of mechanical and/or electrical concepts of varying complexity that can be used to engage between the door and the door frame to prevent motion of the door until the lock is disengaged.

Figure 14A:
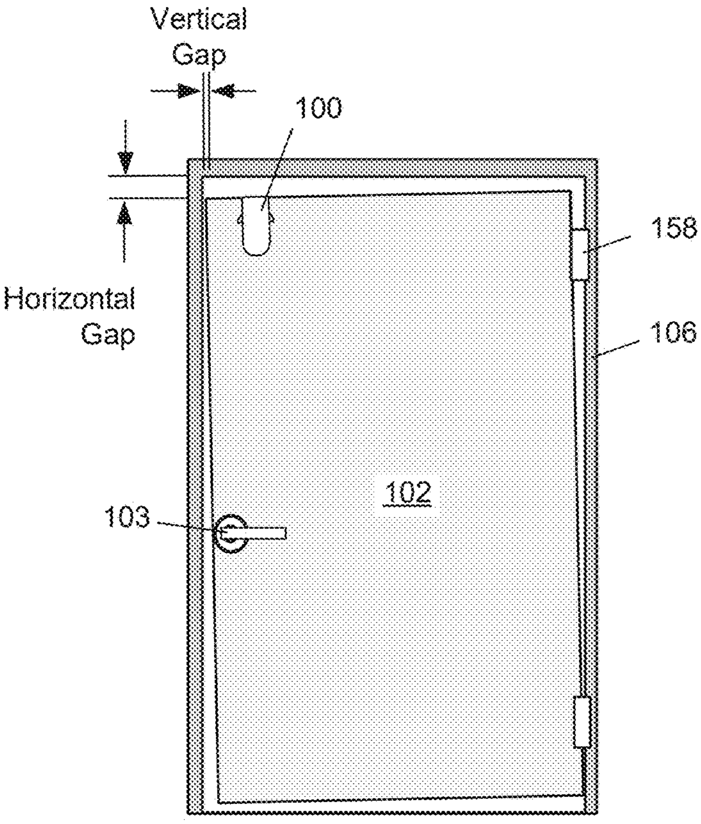
FIGS. 14A and 14B show various diagrams related to gaps between a door and a door frame, according to one example of principles described herein.
Figure 14B:
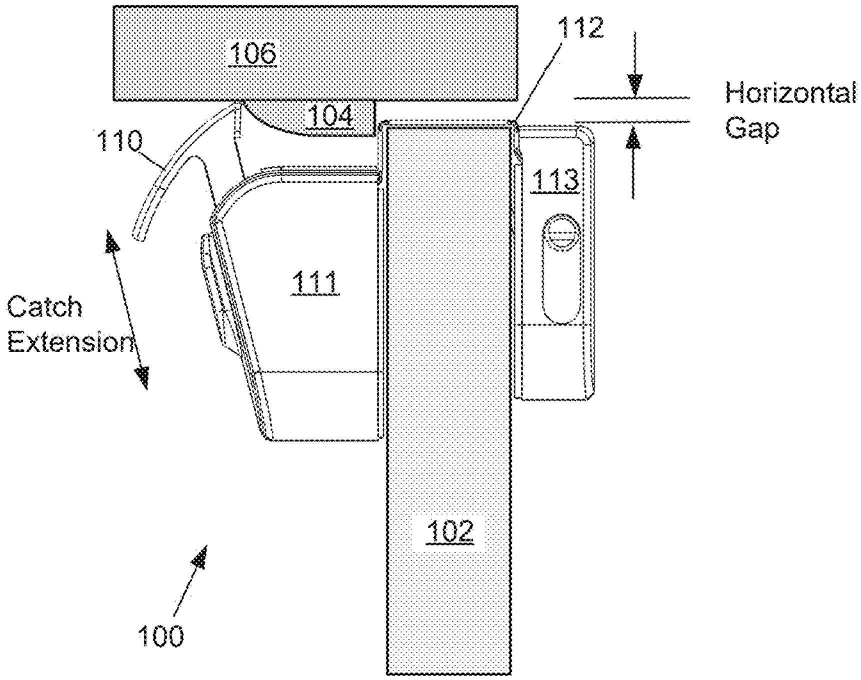

FIGS. 14A and 14B show various diagrams related to gaps between a door and a door frame. FIG. 14A shows a door (102) fitted in a door frame (106) and supported by hinges (158). Typically, the door (102) would be installed so that the gaps between the door (102) and the door frame (106) are uniform and the door (102) is square with the door frame (106). However, if the door is carelessly installed the gaps may vary in width. Typically the vertical gap on the side of the door with the handle is carefully controlled during installation. This is because the vertical gap influences function and aesthetics of the door more strongly than other gaps. The gap determines how the door functions for several reasons. If the gap is too small the door will hit the door jamb and not close, or if the door is closed it may be difficult to open. If the gap is too large, the latch on the door handle may not engage securely with the strike plate/cutout in the door frame. The horizontal gaps at the top of the door and the bottom of the door are less controlled and often larger. For example, the gap at the bottom of the door may be left intentionally larger to allow for air circulation and clearance for floor coverings such as carpet or rugs. The gap on the upper side of the door is typically smaller, but is less visible to the user and may still be significantly larger/less controlled than the vertical gap.

Regardless of how the door is initially installed, the gaps may change over time for various reasons, such as misuse, the weight of the door, shifting of the door frame/wall, warping or other effects. This causes the gaps around the door to change and shift and can result in uneven gaps around the door. FIG. 14A shows an illustrative instance of a door (102) with a typical pattern of uneven gaps that is indicative of the weight of the door causing the door (102) to sag. The gaps have been exaggerated for purposes of illustration. The vertical gap is narrow at the top and widens toward the bottom of the door. The horizontal gap is wide near the left door frame and progressively narrows toward the hinge (158). Because the lock (100) is to be placed out of reach of children, it should be placed over the door edge along the upper portion of the vertical gap or along the horizontal gap at the top of the door (typically toward the door handle side). Thus, it can be helpful if the lock (100) is configured to manage both narrow gaps and wide gaps. To work in narrow gaps the U bracket (112) could be relatively thin so that the door (102) will still close when the lock (100) is in place. The catch (110) should be configured to engage the door stop/door jamb (104) at a variety of distances, including close distances for narrow gaps and longer distances for wide gaps. In some examples, the extension or range of the catch (110) can be configured to engage with door jambs (104) that vary in distances of up to 25 mm or more. In other designs the extension may be less or more. FIG. 14A shows the lock (100) secured on the upper edge of a door (102). FIG. 14B show a cross sectional view of the lock (100) on the door (102), with the U bracket (112) straddling the door (102) and the release mechanism (113) on one side of the door (102) and the catch mechanism (111) on the opposite side of the door (102). The catch (110) extends from the catch mechanism (111) to engage with the door frame (106) and/or the door stop/door jamb (104). Because it is desirable for the catch (110) to securely engage with the door stop/door jamb (104) it can be beneficial for the catch (110) to have extension that is greater than the distance between the catch (110) and the door frame (106). This allows for the remaining spring compression of springs within the catch mechanism (111) to press the catch (110) against the door frame (106) and allow the catch (110) to engage with the often small or sloping profile of the door stop/door jamb (104). As discussed above, this distance is affected by the horizontal or vertical gap between the door (102) and the door frame (106). Consequently, for the lock (100) to maintain compatibility with a wide range of doors and door installations, it is beneficial for the catch (110) to have an appropriate range of travel to engage with the door jamb (104). Longer ranges of travel have a variety of effects that can be appropriately designed for, including greater lever arms, larger internal forces, longer sliding and spring mechanisms, etc.

Figure 15:
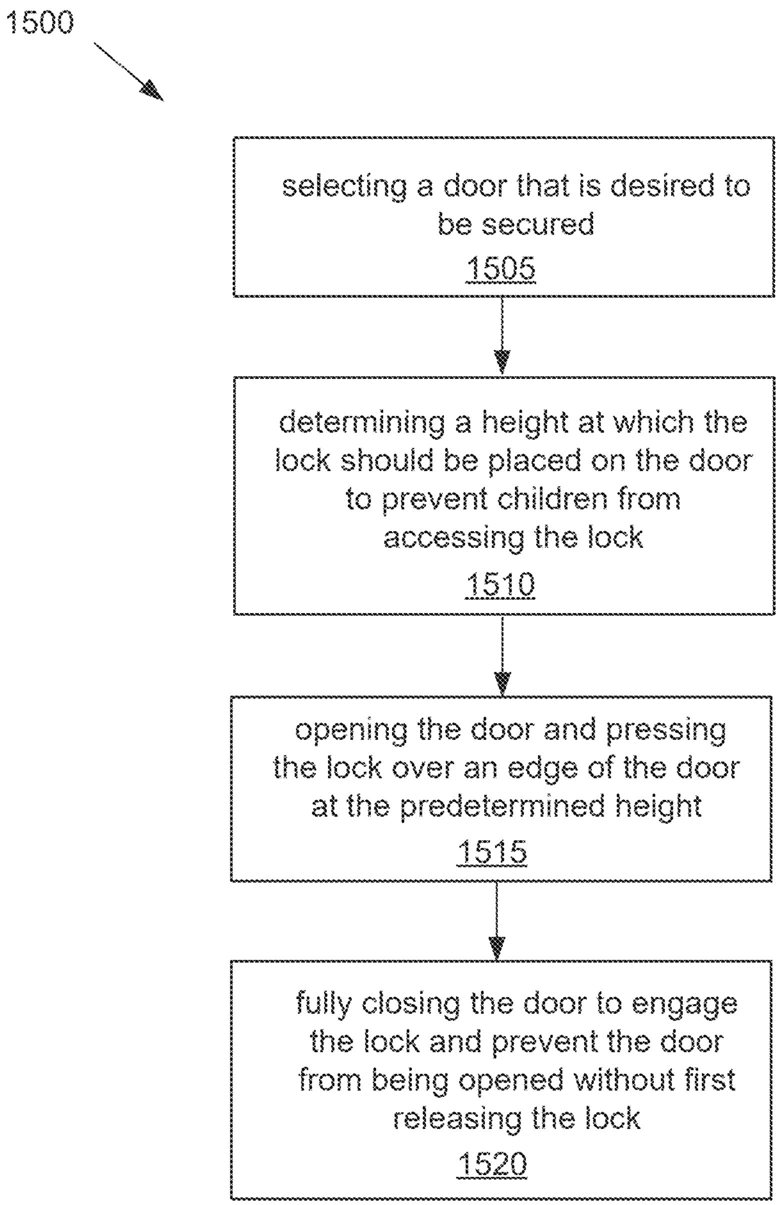
FIG. 15 is a diagram of an illustrative method for installing a lock over a door according to one example of principles described herein.

FIG. 15 describes an illustrative method for installing a lock (1500). The method may include selecting a door that is desired to be secured (step 1505), determining a height at which the lock should be placed on the door to prevent children from accessing the lock (step 1510), opening the door and pressing the lock over an edge of the door at approximately the predetermined height (step 1515); and fully closing the door to engage the lock and prevent the door from being opened without first releasing the lock (step 1520).

The illustrative method described above is only one example. There are a variety of implementations. For example, the steps may be reordered, repeated, deleted or additional steps may be added. In one example, the step of determining a height at which the lock should be placed to prevent children from accessing the lock can be omitted by placing the lock over the horizontal top edge of the door. There is no position on the door that is higher than this.

In some buildings the doors may have different thicknesses. The lock may be adjusted for this in a number of ways, including changing the thickness pads or layers on the inside of the release mechanism and/or catch mechanism. In some embodiments, the metal bracket may be adjustable. In other embodiments, the catch or release mechanisms may have adjustable attachments to the metal bracket, thereby increasing or decreasing the width of the opening that receives the door edge.

Although the lock (100) may be specifically described and suitable for preventing children from opening doors, the principles described herein have broad applicability to a range of different lock designs and functions. These principles may be useful in designing locks for older people, pets, interior doors, exterior doors, a range of door sizes and types. Locks designed according to the principles described may provide one or more of the following benefits: quick and easy installation with or without tools or fasteners, the locks allow the door to shut completely when they are installed, the locks can be opened from both sides of the door, and in many situations the door and door frame do not have to be altered or damaged in any way for the lock to be installed and function. The principles show a number of examples where the lock automatically engages with the door when the door is shut, but may have a disabling mechanism (e.g. the catch lock) that allows the lock to be disabled such that the door operates in the normal fashion. Additionally, the principles teach that various lock designs can result in locks that are easy to install, easy to remove, and easy to adapt to changing circumstances. Further, the function of the various designs can result in a lock that is easy to engage and easy to open with either one hand or two hands.

For example, if a parent is concerned about a child getting to a pantry, the parent can install the lock on the pantry door. However, when the parent is actively working in the kitchen it may be desirable for the lock to be disengaged so that the adult doesn't have to open the lock every time they access the pantry. The parent can engage the catch lock and secure the catch in the retracted position while they are working the kitchen. Alternatively, because the lock is so easy to install, the parent may simply remove the lock while they are in the kitchen and replace it when the meal is prepared. Similarly, if the parent decides that a different door (such as the door to a stairway) is more important to secure, the lock can be easily moved to that door. If a door has a particularly tight vertical spacing between the door and the door frame, the lock can be moved to the top edge of the door where there is more room. Similarly, if the child grows up and uses a chair to reach the lock, the lock can be moved farther up the door or placed on the top edge of the door.

The lock could be useful in securing pets or pet doors. If a pet has discovered how to open a door on their own (such as a dog who can manipulate a lever handle of a door), the lock could be used to secure the door out of reach of the pet. If a pet door needs to be locked, the principles described herein could be used to design a retrofit pet door lock that could be easily installed and operated.

If there is an elderly person with mental health issues, it may be desirable to prevent them from entering certain rooms in the house and/or from exiting the house without supervision. The lock may be installed out of reach of the elderly person or may be outside of the person's experience so that they are unable to open doors where it is installed.

Further applications of the principles described may be anywhere a door or gate is desirable to be secured, such as garden gates, barn doors, sheds, vehicles, commercial buildings, access hatches, or other covered openings.

As discussed above with respect to mechanical designs, one end of the ribbon (118) or cable (206) is attached at the ribbon attachment (124) point and extends through the internal structure of the catch body (108). It then loops around the U bracket (112), ensuring a secure and guided pathway. The ribbon (118) continues, sliding through the groove (142), which directs it towards the lower section of the lock (100). This arrangement facilitates the intended movement and function of the lock (100) mechanism.

In some embodiments, the U bracket (112) formed of metal features a groove (142) that is precision-engineered to specifically designed to allow the ribbon (118) to pass through seamlessly. A strategically placed sticker (152) covers the exposed part of the ribbon (118), serving both to shelter its movement within the U bracket (112) and to conceal it, thereby preventing contact with the door frame. In this implementation, the sticker (152) may employ a specialized adhesive applied to its outer edges, ensuring strong attachment to the U bracket (112) while deliberately omitting adhesive from the center portion to avoid interference with the free movement of the ribbon (118). In some embodiments, alternative attachment methods for the sticker (152) are employed to enhance adaptability to different environmental conditions or mechanical requirements. These methods include the use of double-sided tape, which offers reversible attachment; heat-activated adhesive, providing enhanced durability under varying temperature conditions; magnetic stickers, suitable for temporary placements; Velcro strips, allowing for easy repositioning; and clip-on covers, which provide a non-adhesive securing option. Furthermore, the sticker (152) can be affixed using other innovative adhesive materials tailored to specific operational needs.

In one embodiment, a door lock includes a first component on a first side of a door and a second component on a second side of the door. A structure mechanically joins the first component and the second component by passing through a gap between the door and a door frame and a communication connection between the first component and the second component. In some examples, the communication connection may include a mechanical control connection between the first component and the second component. Additionally or alternatively, the communication connection may be one of a wired communication connection and a wireless communication connection. The communication connection may pass through the gap between the door and the door frame. The structure may include clearance for the communication connection. The clearance may be a slot, groove, or an opening or combination thereof. In some embodiments, the structure may surround the communication connection on at least two sides. In several implementations, the structure may surround the communication connection on at least four sides. In some examples, the structure may include a covering on each side of the through slot, such that the communication connection is sandwiched between the coverings. The communication connection may include at least one of: an electrical ribbon cable, a mechanical ribbon, and a mechanical cord.

In one example, the first component of the door lock may include a manually actuated slider disposed on a first side of the door, wherein the first side of the door is opposite the door jamb. The second component may be disposed on a second side of the door that is adjacent to the door jamb. The second component may include a slidable catch that extends to catch on the door jamb and prevent the door from opening. The structure mechanically joining the first component and the second component may include a U bracket that passes through a gap between the door and the door frame and is connected to the first component and the second component. The U bracket may include a clearance path for the communication connection. The communication connection may include a tensile member connected to the manually actuated slider of the first component and to the slidable catch of the second component such that when the manually actuated slider is actuated, the slidable catch disengages from the door jamb to allow the door to be opened.

According to principles described herein an illustrative door lock may include a first component disposed on a side of a door opposite a door jamb. The first component may include a manually actuated slider. A second component may be disposed on a side of the door adjacent to the door jamb, the second component may include a catch configured to extend to catch on the door jamb to prevent the door from opening. The door lock may also include a structure mechanically joining the first component and the second component where the structure includes a U bracket connected to the first component and the second component and passes between a vertical gap between the door and the door frame when the door is fully closed or between a horizontal gap between the door and the door jamb when the door is fully closed. The structure further comprises a clearance path. A tensile member is disposed in the clearance path and may be connected to the manually actuated slider of the first component and to the slidable catch of the second component such that when the manually actuated slider is actuated, the slidable catch disengages from the door jamb to allow the door to be opened.

In one embodiment, a door lock may include a disengagement member on a first side of a door and a latching member on a second and opposite side of the door. The lock may further include a connection between the disengagement member and the latching member such that activation of the disengagement member causes the latching member on the opposite side of the door to disengage so that the door can be opened. In this example, the door is locked in a closed position and the connection is made through a gap between the door frame and the door.

In another embodiment a lock may include a cavity to receive an edge of a door, a catch on a first side of the door and a release on a second side of the door, wherein the door lock is designed to be installed over the edge of a door without tools and without damaging the door or the door frame. Further, the door lock is to secure the door in a fully closed position when the door lock is locked. In this example, the door lock may be configured to be opened from either side of the closed door. Further, the door lock may be installed at any desired height along the vertical edge of the door and installation can be performed by manually pushing the door lock over an edge of the door.

A door lock may include a first component on a first side of a door and a second component on a second side of the door, with a structure mechanically joining the first component and the second component by passing through a gap between the door and a door frame, wherein the gap is defined by the door being fully closed and the door's latch being received into the door frame. The door lock includes a catch to engage with a feature connected to the door. The feature may be the door frame, a door jamb, a feature installed by the user, or another feature.

Thus, the locks described herein may have a number of advantages, including installing in seconds without tools or damage to the door, allowing the door to be completely closed when the lock is in place, locking the door securely while still allowing the lock and door to be opened from both sides. Having the door completely closed when the lock is in place is significant for at least the following reasons The principles described provide for a wide range of locks that are easy to install over the edge of the door and stay in place on the door once placed there. The illustrative locks may function with a wide range of doors, including interior doors and doors with different thicknesses. The locks can securely grip the door jamb, door frame, bracket or other elements connected to the door frame. The locks can be opened smoothly and with reasonable force from both sides of the door.

In one embodiment the door lock may include a first component to be fixed on one side of a door and a second component to be fixed on the opposite side. These two components are mechanically joined by a structure that passes through a gap between the closed door and the door frame. A communication connection between the first and second components facilitates their interaction. The communication connection can be a mechanical control connection, a wired connection, or a wireless connection, and it is designed to pass through the gap between the closed door and the door frame. The structure includes a clearance for the communication connection and surrounds it on at least two sides, with some embodiments surrounding it on all four sides.

This clearance can be in the form of a channel or a slot within the structure. In some designs, the slot is covered on each side, so the communication connection is sandwiched between the coverings, ensuring protection and secure placement. The communication connection itself may be an electrical ribbon cable, a mechanical ribbon, or a mechanical cord.

One embodiment of the door lock features a manually actuated slider on the first component, which is positioned on the side of the door opposite the door jamb. The second component, situated adjacent to the door jamb, includes a slidable catch that extends to engage with the door jamb, preventing the door from opening. The structure that joins the first and second components comprises a U bracket that passes through the gap between the door and the door frame when the door is fully closed. This U bracket includes a clearance path for the communication connection, which is a tensile member connected to the manually actuated slider of the first component and to the slidable catch of the second component. When the slider is actuated, the catch disengages from the door jamb, allowing the door to be opened.

Additionally, some examples include a lock with a structure designed to fit through a gap between the door frame and a closed door, featuring a catch that engages with an existing feature of the door frame or door jamb. A release mechanism is connected to the structure, enabling the catch to disengage from the existing feature of the door frame or door jamb. The structure is configured to position the release on one side of the door and the catch on the other side, with a communication connection that facilitates interaction between the release and the catch. This communication connection may be a ribbon or an electrical connection.

Another embodiment of the lock includes a catch and a release, connected by a bracket that attaches around the edge of the door when it is closed, fixing the catch and the release to opposite sides of the door. This bracket may include a slot or channel to accommodate the communication connection, which can be a mechanical linkage, a cable, a ribbon, or an electrical wire. The release features a manually operable slider that retracts the catch when actuated. The catch is biased towards an extended position by a spring mechanism, and the bracket includes a resilient material that clamps onto the door surface without causing damage, maintaining the lock's position when the door is fully closed.

Overall, the described door lock is designed to be easily installed without tools, does not damage the door or frame, and allows the door to be fully closed while securely locked, yet easily opened from both sides. The lock can be adjusted for different door thicknesses and provides secure engagement with the door jamb or frame, making it a versatile and user-friendly security solution.

The preceding description has been presented only to illustrate and describe examples of the principles described. This description is not intended to be exhaustive or to limit these principles to any precise form disclosed. Many modifications and variations are possible in light of the above teaching.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A door lock comprising:

a first component to be supported on a first side of a door;

a second component to be supported on a second, opposite side of the door;

a structure mechanically joining the first component and the second component, wherein the structure comprises a first portion positioned proximate the second side of the door and an edge portion positioned proximate an edge of the door; and a tensile member extending between the first component and the second component, wherein the tensile member is slidably movable along a guide path that extends along the edge portion and along at least part of the first portion.

2. The door lock of claim 1, wherein the tensile member is to pass through a gap between the door in a closed position and a door frame corresponding to the door.

3. The door lock of claim 1, wherein the structure surrounds the tensile member on at least two sides.

4. The door lock of claim 1, wherein the guide path extending along the edge portion is to pass through a gap between the door and a door frame when the door is closed, and the guide path extending along the first portion is to pass through a gap between the door and a door jamb when the door is closed.

5. The door lock of claim 4, wherein the structure prevents the tensile member from being pinched between the door and the door frame and from being pinched between the door and the door jamb.

6. The door lock of claim 1, wherein the tensile member comprises at least one of a mechanical ribbon or a mechanical cord.

7. The door lock of claim 1, wherein:

the first component is to be disposed on the first side of the door and comprises a manually actuated slider, wherein the first side of the door is a side opposite a door jamb;

the second component is to be disposed on the second side of the door that is adjacent to the door jamb, the second component comprising a slidable catch configured to extend to catch on the door jamb and prevent the door from opening;

the structure mechanically joining the first component and the second component comprises a bracket to pass through a gap between the door and a door frame when the door is fully closed and is connected to the first component and the second component, the structure further comprising a clearance path; and the tensile member is connected to the manually actuated slider of the first component and to the slidable catch of the second component such that when the manually actuated slider is actuated, the slidable catch is to disengage from the door jamb to allow the door to be opened.

8. The door lock of claim 1, wherein the structure maintains a predetermined minimum spacing between the door and a door frame and between the door and a door jamb such that the tensile member is slidably movable along the guide path.

9. The door lock of claim 8, wherein the guide path is bounded on at least one side by the structure.

10. A door lock comprising:

a structure to slide over an edge of a door;

a movable release mounted to a first side of the structure;

a movable catch mounted to a second, opposite side of the structure such that when the structure is over the edge of the door, the movable release is to be on a first side of the door and the movable catch is to be on a second, opposite side of the door; and a tensile member extending between the movable release and the movable catch;

wherein the structure defines a clearance path along which the tensile member extends, such that, when the structure is received over the edge of the door, the tensile member is freely movable relative to the structure and the door; and wherein the clearance path is to pass along at least a portion of the first side of the structure, at least a portion of the second side of the structure, and through a gap between a fully closed door and a corresponding door jamb.

11. The door lock of claim 10, wherein:

the structure comprises a bracket, a release body, and a catch body;

the movable release is configured to move within the release body;

the movable catch is configured to move within the catch body; and the movable release is configured to apply a tensile force on the tensile member, the tensile force urging the tensile member along the clearance path to cause the movable catch to disengage from a feature of a door frame or a door jamb.

12. The door lock of claim 10, wherein the structure is configured to slide over the edge of the door and removably mount the movable release and the movable catch to the door without adhesives or tools.

13. The door lock of claim 10, wherein the structure is configured to maintain a first gap between the door and a door jamb when the door is closed and maintain a second gap between the door and a corresponding door frame when the door is closed such that the tensile member is freely movable relative to the structure and the door.

14. A lock comprising:

a structure configured to mount over an edge portion of a door, wherein the structure extends along the edge portion of the door and defines a tensile member guided path adjacent the edge portion;

a catch joined to the structure and configured to be mounted to the structure on a second side of the door;

a release joined to the structure and configured to be mounted to the structure on a first side of the door; and a tensile member extending between the catch and the release and routed along the tensile member guided path, the tensile member being slidably movable relative to the structure along the tensile member guided path;

wherein, when the door is closed, the tensile member passes between the door and an adjacent door frame along the tensile member guided path, and moving the release causes the tensile member to slide along the tensile member guided path to mechanically retract the catch.

15. The lock of claim 14, wherein the catch is biased towards an extended position by a spring mechanism and automatically engages with a door jamb when the door is closed.

16. The lock of claim 14, further comprising a bracket to fix the catch to the second side of the door and the release to the first side of the door, wherein the bracket includes a resilient material that clamps onto a surface of the door without causing damage, maintaining a position of the lock on the door during use.

17. The lock of claim 14, further comprising at least one resilient pad configured to be in contact with the door when the structure is mounted over the edge portion of the door.

18. The lock of claim 14, further comprising a catch lock to lock the catch in a retracted position such that the door can be operated normally.

* * * * *